US007087348B2

(12) United States Patent
Holman et al.

(10) Patent No.: US 7,087,348 B2
(45) Date of Patent: Aug. 8, 2006

(54) COATED ELECTRODE PARTICLES FOR COMPOSITE ELECTRODES AND ELECTROCHEMICAL CELLS

(75) Inventors: Richard K. Holman, Belmont, MA (US); Yet Ming Chiang, Framingham, MA (US); Antoni S. Gozdz, Marlborough, MA (US); Andrew L. Loxley, Roslindale, MA (US); Benjamin Nunes, Allston, MA (US); Michele Ostraat, Whitehouse Station, NJ (US); Gilbert N. Riley, Marlborough, MA (US); Michael S. Viola, Burlington, MA (US)

(73) Assignee: A123 Systems, Inc., Watertown, MA (US)

( * ) Notice: Subject to any disclaimer, the term of this patent is extended or adjusted under 35 U.S.C. 154(b) by 0 days.

(21) Appl. No.: 10/354,405

(22) Filed: Jan. 30, 2003

(65) Prior Publication Data

US 2004/0018430 A1    Jan. 29, 2004

Related U.S. Application Data

(60) Provisional application No. 60/398,697, filed on Jul. 26, 2002.

(51) Int. Cl.
*H01M 4/02* (2006.01)
*B23H 3/04* (2006.01)

(52) U.S. Cl. .................. 429/209; 429/217; 429/137; 429/233; 204/290.01

(58) Field of Classification Search ................ 429/233, 429/217, 232, 236, 209, 215, 137, 135; 204/290.05, 204/290.01, 288.2; 427/58; 428/407, 403
See application file for complete search history.

(56) References Cited

U.S. PATENT DOCUMENTS

| | | | |
|---|---|---|---|
| 3,765,943 A | 10/1973 | Biagetti | |
| 3,864,167 A | 2/1975 | Broadhead et al. | |
| 4,245,016 A | 1/1981 | Rampel | |
| 4,555,454 A | 11/1985 | Shuster | |
| 4,599,114 A | 7/1986 | Atkinson | |
| 4,615,784 A | 10/1986 | Stewart et al. | |
| 4,668,596 A | 5/1987 | Shacklette et al. | |
| 4,758,483 A | 7/1988 | Armand et al. | |
| 4,889,777 A | 12/1989 | Akuto | |
| 5,100,747 A | 3/1992 | Hayashida et al. | |
| 5,187,209 A | 2/1993 | Hirai et al. | |
| 5,213,895 A | 5/1993 | Hirai et al. | |
| 5,227,267 A | 7/1993 | Goebel et al. | |
| 5,294,504 A | 3/1994 | Otagawa et al. | |
| 5,399,447 A | 3/1995 | Chaloner Gill et al. | |
| 5,436,093 A | 7/1995 | Huang et al. | |
| 5,441,830 A | 8/1995 | Moulton et al. | |
| 5,464,707 A | 11/1995 | Moulton et al. | |
| 5,478,676 A | 12/1995 | Turi et al. | |
| 5,518,833 A | 5/1996 | Repplinger et al. | |
| 5,520,850 A | 5/1996 | Chaloner Gill et al. | |
| 5,527,641 A | 6/1996 | Koshiishi et al. | |
| 5,554,459 A | 9/1996 | Gozdz et al. | |
| 5,567,754 A | 10/1996 | Stramel | |
| 5,578,396 A | 11/1996 | Fauteux et al. | |
| 5,587,253 A | 12/1996 | Gozdz et al. | |
| 5,588,971 A | 12/1996 | Fauteux et al. | |
| 5,589,297 A | 12/1996 | Koga et al. | |
| 5,591,544 A | 1/1997 | Fauteux et al. | |
| 5,624,605 A | 4/1997 | Cao et al. | |
| 5,654,115 A | 8/1997 | Hasebe et al. | |
| 5,677,080 A | 10/1997 | Chen | |
| 5,698,342 A | 12/1997 | Klein | |
| 5,705,291 A * | 1/1998 | Amatucci et al. ........... 429/137 |
| 5,714,053 A | 2/1998 | Howard et al. | |
| 5,733,683 A | 3/1998 | Searson et al. | |
| 5,759,714 A | 6/1998 | Matsufuji et al. | |
| 5,789,100 A | 8/1998 | Burroughs et al. | |
| 5,821,033 A | 10/1998 | Cromack et al. | |
| 5,827,615 A | 10/1998 | Touhsaent | |
| 5,834,136 A | 11/1998 | Gao et al. | |
| 5,840,087 A | 11/1998 | Gozdz et al. | |
| 5,897,522 A | 4/1999 | Nitzan | |
| 5,902,689 A | 5/1999 | Vleggaar et al. | |
| 5,910,382 A | 6/1999 | Goodenough et al. | |
| 5,925,283 A | 7/1999 | Taniuchi et al. | |
| 6,063,519 A | 5/2000 | Barker et al. | |

(Continued)

FOREIGN PATENT DOCUMENTS

CA    2270771    10/2000

(Continued)

OTHER PUBLICATIONS

Aleshin, et al. (1998) "Transport properties of poly (3,4-ethylenedioxythiophene/poly(styrenesulfonate)", *Synthetic Metals*, 94 pp. 173-177.

(Continued)

*Primary Examiner*—Raymond Alejandro
(74) *Attorney, Agent, or Firm*—Wilmer Cutler Pickering Hale and Dorr LLP

(57) ABSTRACT

Electrodes for use in electrochemical devices are disclosed. More particularly coated electrode particles for use in solid electrochemical cells and materials and systems for improving electronic conductivity and repulsive force characteristics of an electrode network are disclosed. An article containing a plurality of distinct first particles that form an electrode network in which the distinct first particles are coated with a system of electrically conductive material is also disclosed. In some embodiments, the coating layer also includes a low refractive index material. In some embodiments, the coating layer of the electroactive material includes a plurality of second particles.

52 Claims, 6 Drawing Sheets

U.S. PATENT DOCUMENTS

| | | | |
|---|---|---|---|
| 6,069,221 | A | 5/2000 | Chasser et al. |
| RE36,843 | E | 8/2000 | Lake et al. |
| 6,096,453 | A | 8/2000 | Grunwald |
| 6,096,454 | A | 8/2000 | Tran et al. |
| 6,117,593 | A | 9/2000 | Stachoviak et al. |
| 6,120,940 | A | 9/2000 | Poehler et al. |
| 6,136,476 | A | 10/2000 | Schutts et al. |
| 6,159,389 | A | 12/2000 | Miura et al. |
| 6,174,623 | B1 * | 1/2001 | Shackle ............ 429/218.1 |
| 6,231,779 | B1 | 5/2001 | Chiang et al. |
| 6,280,875 | B1 | 8/2001 | Kwak et al. |
| 6,291,097 | B1 | 9/2001 | Barker et al. |
| 6,300,016 | B1 | 10/2001 | Jan et al. |
| 6,306,540 | B1 | 10/2001 | Hiroi et al. |
| 6,322,924 | B1 | 11/2001 | Hirahara et al. |
| 6,337,156 | B1 | 1/2002 | Narang et al. |
| 6,342,317 | B1 | 1/2002 | Patel et al. |
| 6,395,429 | B1 | 5/2002 | Kang et al. |
| 6,403,263 | B1 | 6/2002 | Roach |
| 6,410,189 | B1 | 6/2002 | Yamada et al. |
| 6,413,284 | B1 | 7/2002 | Chu et al. |
| 6,413,285 | B1 | 7/2002 | Chu et al. |
| 6,495,283 | B1 | 12/2002 | Yoon et al. |
| 6,528,033 | B1 | 3/2003 | Barker et al. |
| 6,599,662 | B1 | 7/2003 | Chiang et al. |
| 6,753,111 | B1 * | 6/2004 | Kweon et al. ......... 429/231.95 |
| 6,764,525 | B1 | 7/2004 | Whitacre et al. |
| 6,797,435 | B1 * | 9/2004 | Kweon et al. ......... 429/231.95 |
| 6,800,399 | B1 | 10/2004 | Matsumoto |
| 6,818,356 | B1 | 11/2004 | Bates |
| 6,878,487 | B1 | 4/2005 | Cho et al. |
| 2001/0005558 | A1 * | 6/2001 | Yoshioka et al. ............ 429/62 |
| 2001/0005562 | A1 | 6/2001 | Yoshioka et al. |
| 2001/0007726 | A1 | 7/2001 | Yoshioka et al. |
| 2002/0015278 | A1 | 2/2002 | Fukuyama et al. |
| 2002/0036282 | A1 | 3/2002 | Chiang et al. |
| 2002/0048706 | A1 | 4/2002 | Mayes et al. |
| 2002/0071990 | A1 * | 6/2002 | Kweon et al. ........... 429/231.1 |
| 2002/0071991 | A1 | 6/2002 | Kweon et al. |
| 2002/0074972 | A1 | 6/2002 | Narang et al. |
| 2002/0192137 | A1 | 12/2002 | Chaloner-Gill et al. |
| 2002/0195591 | A1 | 12/2002 | Ravet et al. |
| 2003/0003352 | A1 * | 1/2003 | Kweon et al. .............. 429/137 |
| 2003/0008212 | A1 | 1/2003 | Akashi et al. |
| 2003/0049529 | A1 | 3/2003 | Cho et al. |
| 2003/0054250 | A1 * | 3/2003 | Kweon et al. ........... 429/231.1 |
| 2003/0082446 | A1 | 5/2003 | Chiang et al. |
| 2003/0099884 | A1 | 5/2003 | Chiang et al. |
| 2004/0005265 | A1 | 1/2004 | Chiang et al. |
| 2004/0018429 | A1 * | 1/2004 | Kweon et al. .............. 429/232 |
| 2004/0018430 | A1 | 1/2004 | Holman et al. |
| 2004/0151887 | A1 * | 8/2004 | Forrest et al. .............. 428/212 |
| 2004/0185343 | A1 | 9/2004 | Wang et al. |
| 2004/0265692 | A1 | 12/2004 | Long et al. |
| 2005/0026037 | A1 | 2/2005 | Riley et al. |
| 2005/0034993 | A1 | 2/2005 | Gozdz et al. |

FOREIGN PATENT DOCUMENTS

| | | |
|---|---|---|
| EP | 0 071 119 | 9/1983 |
| EP | 1231651 | 8/2002 |
| EP | 1231653 | 8/2002 |
| JP | 04-58455 | 2/1992 |
| JP | 07101728 | 4/1995 |
| JP | 09022693 | 1/1997 |
| JP | 09147862 | 6/1997 |
| WO | WO-98/12761 | 3/1998 |
| WO | WO-98/16960 | 4/1998 |
| WO | WO-99/33129 | 7/1999 |
| WO | WO-99/56331 | 11/1999 |
| WO | WO-00/41256 | 7/2000 |
| WO | WO-01/77501 | 10/2001 |
| WO | WO-02/43168 | 5/2002 |
| WO | WO-03/012908 | 2/2003 |
| WO | WO-03/056646 | 7/2003 |

OTHER PUBLICATIONS

Armand et al., (1979)"Fast Ion Transport in Solids," *proceedings of the International conference on Fast ion Transport in Solids, Electrodes and Electrolytes*, Lake Geneva, Wisconsin, p. 31.

Chiang, et al.,(1999) High Capacity, Temperature-Stable Lithium Aluminum Manganese Oxide Cathodes for Rechargeable Batteries, *Electrochem. Sol. St. Lett.* 2(3), pp. 107-110 (1999).

French et al., (1995) "Full Spectral Calculation of Non-Retarded Hamaker Constants for Ceramic Systems from Interband Transition Strengths," *Solid State Ionics*, 75, pp. 13-33.

French, R.. (2000) "Origins and Applications of London Dispersion Forces and Hamaker Constants in Ceramics" *Journal of the American Ceramic Society*, 83[9], 2117-46.

Ghosh et al., *Adv. Mater*, 10:1097 (1998).

Gray, F. M. (1991) "Solid Polymer Electrolytes: Fundamentals and Technological Applications," VCH, New York.

Idota et al., (1997) "Tin-Based Amorphous Oxide: A high Capacity Lithium-Ion-Storage Material" *Science*, 276, p. 1395.

Kuwabata et al., (1999) "Charge-discharge properties of composites of LiMn204 and polypyrrole as positive electrode materials for 4 V class of rechargeable Li Batteries" *Electrochimica Acta*, 44:4593-4600 (1999).

Limthongkul et al., (2001) "Nanocomposite Li-Ion Battery Anodes Produced by the Partial Reduction of Mixed Oxides," *Chem. Mater*, 13, pp. 2397-2402.

Milling et al., (1996) "Direct Measurement of Repulsive van der Waals interactions using an Atomic Force Microscope" *Journal of Colloid and Interface Science*, 180, pp. 460-465.

Neumannn et al., (1979) "Negative Hamaker Coefficients" *Colloid and Polymer Sci.*, 257, pp. 413-419.

Ohzuku, et al., Synthesis and Characterization of LiAL¼Ni¾O2 for Lithium-Ion (Shuttle Cock) Batteries, *J. Electrochem. Soc.*, vol. 143, p. 4033 (1995).

Van Oss et al., (1977) "Comparison Between Antigen-Antibody Binding Energies" *Imunnunol. Comm.*, 6(4), pp. 341-354.

Van Oss et al., (1979) "Repulsive Van Der Waals Foces" *Imunnunol. Comm.*, (8)1, pp. 11-29.

Van Oss et al., (1979) "Repulsive van der Waals Forces" *Separation Sci. Tech.* 14(4), pp. 305-317.

Van Oss et al., (1980) "Applications of Net Repulsive Van der Waals forces between different particles, macromolecules or biological cells in liquids" *Colloids and Surfaces*, 1, pp. 45-56.

Wang et al., (2002) "All Solid State Ll/LixMnO2 Polymer Battery Using Ceramic Modified Polymer Electrolytes", *Journal of Electrochem. Soc.* 149 (8), A967.

Zallen, (183) "The Physics of Amorphous Materials," J. Wiley & Sons, N.Y.

Bouridah et al.(1985) "Poly(Dimethylsiloxane)-Poly(Ethylene Oxide) Based Polyurethane Networks Used as Electrolytes in Lithium Electrochemical Solid State Batteries," Solid State Ionics, 15 pp. 233-240.

Broadhead et al. (1995) "Electrochemical Principles and Reactions", Handbook of Batteries, Ch. 2.

Hart et al. (2003) "3-D Microbatteries," Electrochemistry Communications, No. 5, pp. 120-123.

LeCras et al. (1996) "Lithium intercalation in Li-Mg-Mn-O and Li-Al-Mn-O spinels," Solid State Ionics, 89 pp. 203-213.

Matsumoto et al. (1992) "Vaporization of Graphite in Plasma Arc and Indentification of C60 in Deposit," J. Electrochem. Soc., vol. 139 No. 1.

Minnet et al. (1988), "Polymeric Insertion Electrodes," Solid State Ionics, 28-30 1192-1196.

Nagaoka et al., "High Ionic Conductivity in Poly(dimethyl Siloxane-co-Ethylene Oxide) Dissolving Lithium Perchlorate," Dept of Chemistry, Sophia University, pp. 659-663.

* cited by examiner

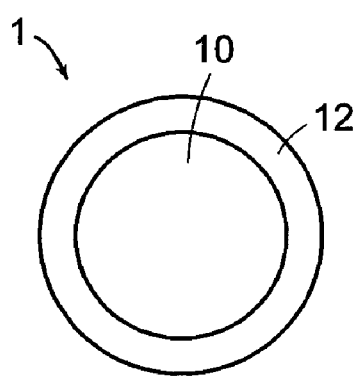
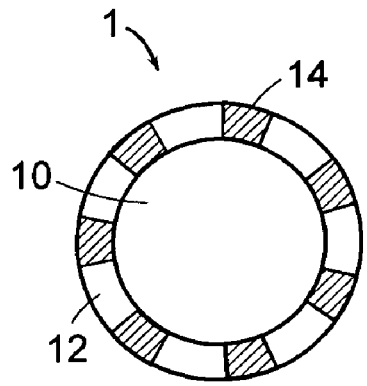
FIG. 1A    FIG. 1C
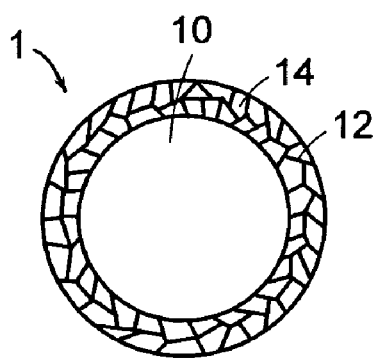
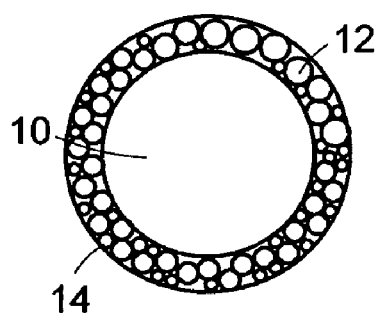
FIG. 1B    FIG. 1D
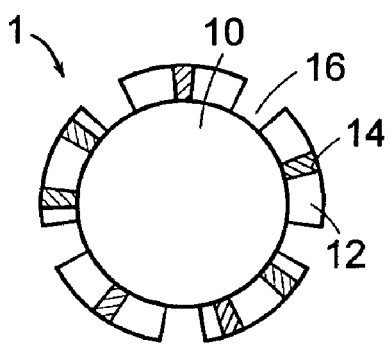
FIG. 1E

COATED ELECTRODE PARTICLES FOR COMPOSITE ELECTRODES AND ELECTROCHEMICAL CELLS

RELATED APPLICATIONS

This application claims priority under 35 U.S.C. § 119(e) to copending provisional application U.S. Ser. No. 60/398,697 entitled "Encapsulated Electrode Particles For Composite Electrodes And Electrochemical Cells" and filed on Jul. 26, 2002, which is incorporated herein by reference.

BACKGROUND OF THE INVENTION

1. Field of the Invention

The present invention relates generally to electrodes for use in electrochemical devices, and more particularly, to composite electrodes and encapsulated electrode particles for use in solid electrochemical devices.

2. Description of the Related Art

Solid electrochemical devices such as the lithium solid polymer electrolyte rechargeable battery is an attractive technology for rechargeable battery applications due to its high predicted energy density, freedom in battery configuration, minimal potential for environmental and safety hazard, and low associated materials and processing costs. The solid electrochemical device usually consists of a solid electrolyte interposed between an anode and a cathode. The solid electrolyte may be a composite consisting of a solid polymeric matrix and an inorganic ion salt. In some implementations, it may consist also of an electrolyte solvent, which acts as a platicizer of the polymer. The cathode may also be a composite material composed of: a solid polymeric matrix, an electroactive material (e.g., a lithium compound), and solvents. The anode is typically an electroactive material capable of intercalating lithium, such as carbon or a metal.

A solid lithium battery is charged by applying a voltage between the battery's electrodes (e.g. cathode and anode networks), which causes lithium ions and electrons to be withdrawn from lithium hosts at the battery's cathode. Lithium ions flow from the cathode to the battery's anode through a polymer electrolyte to be reduced at the anode, the overall process requiring energy. Upon discharge, the reverse occurs; lithium ions and electrons are allowed to re-enter lithium hosts at the cathode while lithium is oxidized to lithium ions at the anode, an energetically favorable process that drives electrons through an external circuit, thereby supplying electric power to a device to which the battery is connected.

For most lithium ion batteries, power density (i.e., the power available from the battery based upon its weight (W/kg) or volume (W/l)) is limited by the resistance to the movement of ions or electrons through the cathode network, the separator and the anode network. This transport-limited quantity is currently a major limitation to the widespread use of lithium ion technology. In order for the lithium ion-electron exchange reactions to occur, it is particularly important that the electroactive materials of the electrodes come into direct contact with the electrolyte material. To facilitate such contact, the common approach has been to maintain an interconnected network, which is filled with a liquid electrolyte or a polymeric gel (within which a liquid electrolyte is dissolved). To assure sufficient levels of electronic conductivity, the particles of electroactive material of the electrodes are usually mixed with fine particles of an electrically conductive material such as graphite or carbon black.

For example, cathodes in some rechargeable lithium batteries contain lithium ion host materials, electrically conductive particles that electrically connect the lithium ion hosts to each other and a current collector (i.e., a battery terminal), a binder, and a lithium-conducting liquid electrolyte. The lithium ion hosts typically are particles of lithium intercalation compounds; the electrically conductive particles are typically made of a substance such as carbon black or graphite. The resulting cathode includes a mixture of particles of average size usually on the order of no more than about 20 micron. Anodes for rechargeable lithium-ion batteries typically contain a lithium ion host material such as graphite, optionally a conductive additive, a binder, and a lithium ion-conducting liquid electrolyte.

Generally, when producing these electrodes, a suspension is made of a cathode oxide powder, a binder (e.g., poly (vinylidene fluoride))("PVDF"), a fine conductive additive (e.g., high surface area conductive carbon), and a solvent to produce a castable suspension. The film is cast, printed, or coated on a metal foil current collector or an insulating film. After drying, the electrode is laminated with a separator and a counterelectrode and infused with organic liquid electrolyte to produce a battery cell. Optionally, a cathode oxide with high electronic conductivity, such as $LiMg_{0.05}Co_{0.95}O_2$, is used and no carbon additive is used. However, the power density of such a cell would be quite low.

One drawback with using carbon-based materials as the electrically conductive material is that it significantly alters the rheology of the slurry. Small variations in amount of carbon lead to large variations in coating quality and product performance, resulting in an improper distribution of the electric potential within the electroactive material or incomplete connection of electroactive material to the current collector. Further, variations in the local concentration of mobile ions and gradients within the electroactive material may impair the reversibility of the electrode to operate over a large number of cycles. At a microscopic level, these non-uniform stresses may result in the disintegration of particles of the electroactive material, or the loss of contact between these particles with the surrounding electrically conductive carbon material. These effects may be amplified when significant current density and power are required at the electrode.

An electrode system with higher power and energy densities than the present batteries provide is needed. Energy density (i.e., the ratio of the energy available from the cell to its volume (Wh/l) or weight (Wh/kg)) can be intrinsically determined by the storage materials; the cell voltage can be determined by the difference in lithium electrochemical potential between cathode and anode, while the charge capacity can depend on the lithium concentration that can be reversibly intercalated by the cathode and anode. Power density, on the other hand, can be a transport-limited quantity, determined by the rate at which electrons and lithium ions can be inserted into or removed from the electrodes.

An electrode in a lithium battery that is too thick can limit discharge rate because ion transport from the electrode to the interface with a separator, such as the electrolyte, can be rate limiting. On the other hand, if the electrode layers are very thin, then energy density suffers because the electrolyte, separator, and current collectors occupy a higher volume and contribute to a greater mass relative to the active material of the electrodes. In addition, the discharge rate can be limited by interface resistance that allows only a certain current rate per unit area of interface.

It has been suggested that a conductive polymer may be used to replace carbon as the electrically conductive material in composite electrodes with the hope that the electronic conductivity of the electrode, particularly the cathode, may be improved with a lightweight substitute material. However, it has been found that the electronic conductivity of these materials is generally too low to assure high power density for the battery. Further, these prior art materials have been found to lack electrochemical stability, and thus, are not amenable for use in high cycle long-life secondary cells.

Shackle et al., U.S. Pat. No. 6,174,623, teach coating vanadium oxide electroactive particles with a polyaniline conductive polymer. However, it has been reported that polyaniline compounds may lack the desired level of electrochemical stability such that the cycle life of the constructed battery is undesirably short. This drawback is indicated by charge-discharge tests of polyaniline materials, which are reported in Kuwabata et al., *Electrochemical Acta*, 44:4593–4600 (1999). Another disadvantage of the use of doped polyaniline in place of carbon as a conductive material its low conductivity. For example, it is well known in the art that an acid dopant is required to render virgin polyaniline conductive. Cao et al., U.S. Pat. No. 5,624,605, teach that an acid dopant with a long alkyl group can render polyaniline soluble and, therefore, processable. Shackle teaches the use of such a functional dopant to render the conducting polyaniline soluble and processable, to enable coating of the cathode particles. Cao et al. teach that polyaniline doped in such a way can have a maximum conductivity of about 2 S/cm (a 90:10 blend with polystyrene). The conductivity can be higher (up to about 10 S/cm), if the doped polyaniline is mixed with polyethylene and stretched to orient the conductive domains. However, this technique is not possible when applying the conductive composition to the cathode particle surface by spray drying as taught by Shackle.

Thus, there is significant room for improvements for conductive materials for composite electrodes that provides a combination of sufficient electronic and ionic conductivity, and electrochemical stability to produce batteries with long cycle life and high power density.

SUMMARY OF THE INVENTION

In one aspect, the present invention is directed to an electrochemical device that has a first electrode in electronic communication with a first current collector, a second electrode in electronic communication with a second current collector, and an electrolyte in ionic contact with the first and second electrodes. At least one of the first and second electrodes includes a plurality of electrically connected coated particles made up of electroactive material and a layer that substantially coats an outer surface of the electroactive material. In some embodiments, the layer includes a conductive material and a sufficient amount of low refractive index material to make the refractive index of the layer less than that of the electrolyte or the precursor thereof. In some embodiments, the layer includes a conductive material having an electronic conductivity greater than about 2 S/cm and a Young's modulus less than about 100 GPa. In some embodiments, the layer includes a conductive material having an electronic conductivity greater than about 2 S/cm and is substantially free of elemental carbon. In other embodiments, the dispersion force between particles of one electrode is repulsive with respect to particles of the other electrode when combined with the electrolyte or an electrolyte precursor. The tendency of the electrode particles of the anode and cathode to repel one another, while the particles of like composition are attracted to one another is used to form a self-organizing structure, in which the anode and cathode for dendritic or interpenetrating structures that are electronically isolated from one another. These self-organizing structures are described in greater detail in the copending patent application U.S. Ser. No. 10/266,602, which is incorporated by reference.

In another aspect, the invention provides an electrochemical device that has a first electrode in electronic communication with a first current collector; a second electrode in electronic communication with a second current collector; and a separating medium in contact with said first and second electrodes. At least one the first and second electrodes includes a plurality of electrically connected particles comprising an electroactive material and a layer comprising a conductive material deposited on an outer surface of the electroactive material. Additionally, the dispersion force between particles of one electrode is repulsive with respect to particles of the other electrode when combined with the separating medium. In some embodiments, the separating medium can be ionically conductive or insulating. Examples of electronic devices include batteries, capacitors, diodes, and photovoltaics.

Another aspect of the invention is directed to electrodes useful in conjunction with an electrolyte or its precursor in an electrochemical device. Of particular interest are electrodes having an electroactive material encapsulated by a conducting layer system described herein.

In some embodiments, the electrode is composed of a plurality of electrically connected coated particles, in which the particles include electroactive material and a layer that substantially coats an outer surface of the particle. In some embodiments, the Hamaker constant of the layer and the electroactive material in the presence of an electrolyte or an electrolyte precursor thereof is negative. In some embodiments, the refractive index of the layer is less than that of the electroactive material and lower than that of electrolyte or an electrolyte precursor thereof. In some embodiments, the electronic conductivity of the conductive material layer is greater than about 2 S/cm and the layer has a Young's modulus of less than about 100 GPa. The layer can be substantially free of elemental carbon. The electrode can include a first layer (e.g., a thin film), having an electroactive material and a second layer of conductive particles deposited on the surface of the first layer, having a refractive index less than the refractive index of the electroactive material and less than the refractive index of the electrolyte or its precursor.

The coating of the encapsulated particle substantially coats the outer surface of the electroactive material, and is associated with an individual particle of electroactive material. This is distinguishable from conventional composite electrodes in which the electroactive particles are embedded in a binder, i.e., a matrix. The requirement that the particles be individually coated relates to the ability of the particles to self-organize. Particles embedded in a binder matrix are not capable of self-organization.

In yet another aspect, the invention provides a coated particle useful in the preparation of electrodes for use in electrochemical devices. The particle includes a core of electroactive material and a layer deposited on an outer surface of the electroactive material that substantially coats an outer surface of the electroactive material. The layer includes a network of electrically connected conductive material occupying a region between particles of a low refractive index material. Alternatively, in some embodiments, the layer can be a network interconnected low refractive index material occupying a region between particles of a conductive material that are themselves interconnected. In some embodiments, the layer has an electronic conductivity greater than about 2 S/cm and a Young's modulus less than 100 GPa. In each of these embodiments, the coating or layer can include perforations. The layer can be substantially free from elemental carbon.

The layer that encapsulates the electroactive material of the electrodes includes materials having a desired combination of conductive and other properties, such as surface force characteristics and electrochemical stability. Nonlimiting examples of such materials are, without limitation, conductive polymers, conducting elements, and oxides. Other materials having a desired combination of conductivity, surface force characteristics and stability include, without limitation metals, alloys, carbides and metal sulfides. The conductive polymers can further include dopants to increase the ionic and/or electronic conductivity.

In some embodiments, the layer includes low refractive index materials. Exemplary low refractive index materials include, without limitation, fluorinated polymers, polypropylene, and vanadium oxide. Nonlimiting examples of fluorinated polymers include polytetrafluoroethylene, poly(vinylidene fluoride), fluorinated esters of methacrylic acid (e.g., hexafluoroisopropylmethacrylate, heptafluorobutylmethacrylate, trifluoroethylmethacrylate, and pentafluorobutylmethacrylate), and fluorinated esters of methacrylic acid (e.g., poly(fluoroalkyl acrylate) and their copolymers and blends. Low index materials have an index of refraction of less than 2.0, or less than 1.5, or less than 1.4, or less than 1.35.

The encapsulant layer can also include a filler that is dissolvable upon contact with an electrolyte solution. Exemplary fillers include salts. Dissolution of the filler introduces perforations, e.g., channels or pores, into the layer and provides communication of the electroactive material with the exterior.

In some embodiments, the encapsulating layer has an electronic conductivity of at least about $10^{-2}$ S/cm, 0.1 S/cm, 1 S/cm, 10 S/cm, or 100 S/cm. In some embodiments, the conductive coating system has an ionic conductivity of at least about $10^{-7}$ S/cm, 10 S/cm, or $10^{-4}$ S/cm. In some embodiments, the conductive coating system has a thickness in the range of less than about 1 micron, less than about 0.5 micron, less than about 0.1 micron, or less than about 0.05 micron. In some embodiments, the conductive coating system has an index of refraction lower than about 2.0, about 1.7, about 1.5, about 1.4, or about 1.35.

In other aspects, the invention is directed to a polymer composition having a homogeneous mixture of a conductive polymer and a low refractive index polymer. The mixture can be a dispersion, a solution-dispersion, or a solution. In some embodiments, the low refractive index polymer includes a highly fluorinated polymer. The conductive polymer layer can either elastically or plastically deform. The latex can further include a coalescing agent, such as a low molecular weight polymer or a solvent that softens or swells (gels) one or more of the polymer particle components of the latex. The coalescing agent serves as a film-forming agent by softening the polymer particles so that they elastically deform and neck to provide increased contact from particle to particle. Increased contact improves the percolative pathway in the encapsulating layer, which increases the conductivity of the layer (when the percolative pathway is formed from the conductive particles).

In another aspect, the invention provides a dispersion including a highly fluorinated polymer and particles of an electrically conductive polymer. In some embodiments, the dispersion is highly uniform and substantially free of carbon agglomerations.

In another aspect, the invention provides a composite coating that includes a low refractive index material and an electrically conductive material. The lateral dimension of the conductive material is less than 0.25 micron in the plane of the surface of the coating, and the conductive material is electrically connected. In some embodiments, the invention provides a disperson having non-coalescing, non-deforming component; a soluble polymeric film forming component; a conductive component which is either deformable, in a swollen state, or a colloid of dimensions which can be easily located within the open volume produced by the non-coalescing particles.

In another aspect, the invention provides methods of preparing electrochemical devices by first combining the following materials: a plurality of first particles, a plurality of second particles and a polymer electrolyte or precursor thereof. The first and second particles are selected to exert a repelling force on each other when combined with the polymer electrolyte or precursor thereof. At least one of the first and second particles includes an electroactive material and a layer comprising a conductive material and sufficient low index material such that the refractive index of the layer is less than that of the electrolyte or an electrolyte precursor, and the layer substantially coats an outer surface of the electroactive material. Then, at least a portion of the first particle is segregated into a first spatial region that is essentially free of the second particle to form a network of electrically-connected first components to form a first electrode. Then, at least a portion of the second particle is segregated into a second spatial region that is essentially free of the first particle to form a network of electrically connected second particles to form the second electrode. In this embodiment, the polymer electrolyte is in ionic communication with both the first and second electrodes.

In another aspect, the invention provides a method of making an electrode material for use in conjunction with an electrolyte or its precursor in an electrochemical device. The method includes preparing a dispersion or solution comprising a conductive material and a low refractive index material. Then, the dispersion or solution is deposited as a layer onto an outer surface of an electroactive material, wherein the layer comprises an electrically connected network of conductive material on the electroactive material.

The invention also provides, in another aspect, a method of making a stable dispersion by selecting a conductive material; selecting a low refractive index material that has a refractive index less than the conductive material; selecting a coalescing agent. Then, the conductive material, the low refractive index material, and the coalescing agent are mixed until a homogenous dispersion or solution is obtained.

The invention also provides, in another aspect, a method of screening sample materials capable of exerting repelling forces with electrode materials used in the fabrication of self-organizing battery devices by first preparing a particle or coating of the sample material. Then, a particle of a predetermined electrode material is prepared and an electrolyte or precursor thereof is selected. The electrolyte or its precursor is in physical and chemical contact with the sample material and electrode material. Then, the interaction force between the particle of sample material and the predetermined electrode material is measured to determine whether the particles repel one another in the presence of the conductive medium. In this aspect, the interaction force is measured by atomic force microscopy.

BRIEF DESCRIPTION OF DRAWINGS

Preferred, non-limiting embodiments of the present invention will be described by way of examples with reference to the accompanying figures, in which:

FIGS. 1A–1E are schematic illustrations showing coated electroactive particles according to certain embodiments of the present invention; FIG. 1A illustrates an electroactive particle encapsulated with an electrically conductive material; FIG. 1B illustrates a particle of electroactive material coated with a layer of a low refractive index in which electrically conductive material has been deposited throughout to create conductive paths between the surface of the electroactive material and the exterior of the coating; FIG. 1C illustrates a multi-phase system in which one-phase of electrically conductive material and a second-phase of low refractive index material form a layer around a core of electroactive material; FIG. 1D illustrates a multi-phase system in which a network of connected particles occupy a space between particles of a low refractive index material; and FIG. 1E illustrates a porous coated electroactive particle.

DETAILED DESCRIPTION OF THE INVENTION

Figure 2:
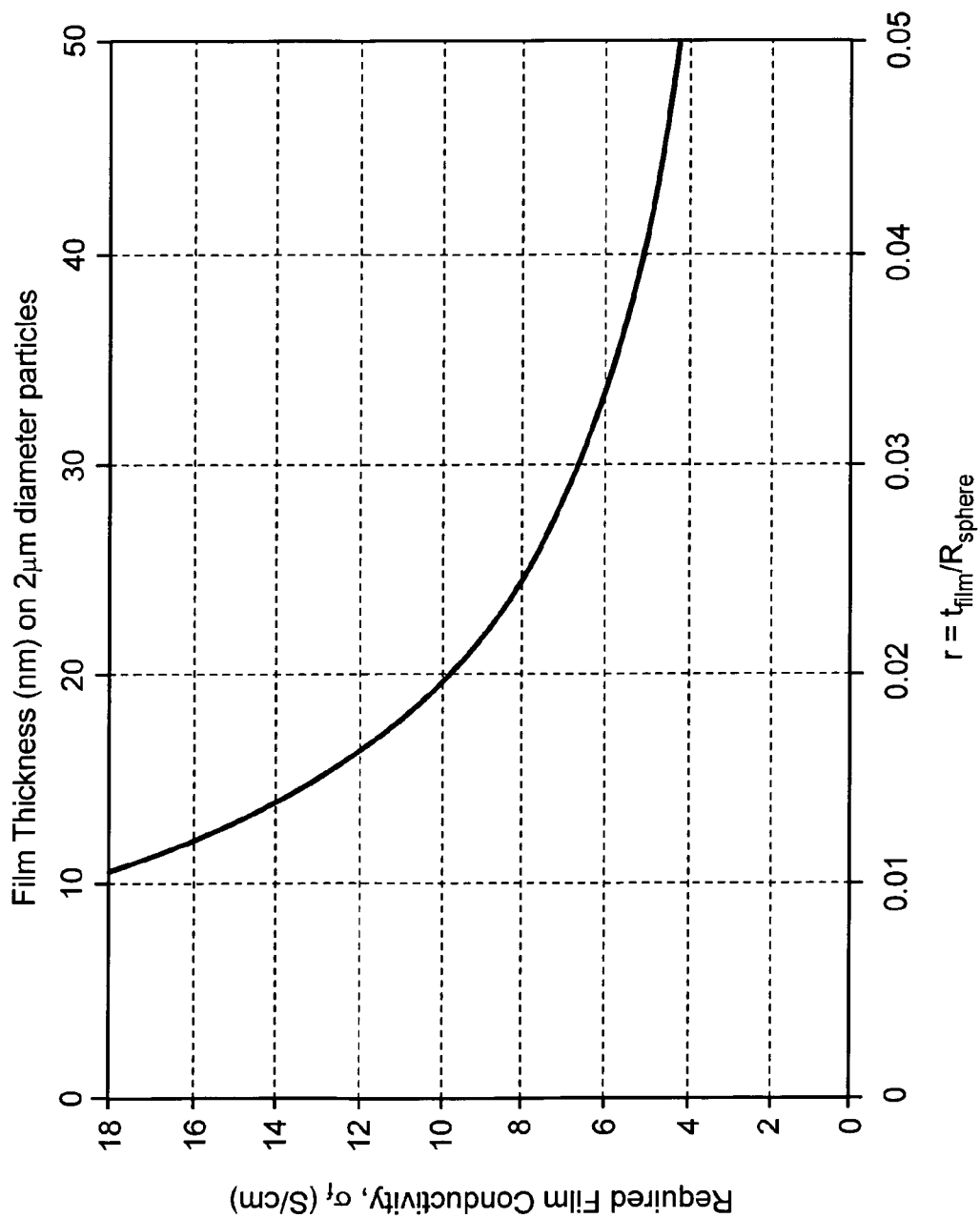
FIG. 2 is a graph showing the relationship between the thickness of the encapsulant layer and the level of conductivity required of the coating material to attain a desired conductivity throughout a network of coated electroactive particles of 2 μm diameter.

The present invention is directed to materials and system designs that optimize desirable properties of electrochemical devices, such as electronic and ionic conductivity, surface force characteristics and electrochemical stability to produce batteries with long cycle life and high energy and power density.

For the purposes of this invention, the following definitions will be used.

"Electronic conductivity" refers to the transport of electrons or electrical charge. "Ionic conductivity" refers to the transport of ions. A material may exhibit electric or ionic conductivity or both. For example, a "conductive polymer" is a polymer that has the capacity to accept and transport ions or electrons. Similarly, a "conductive oxide" is a metal oxide that that has the capacity to accept and transport ions or electrons.

As used herein, "ionically conductive medium" or "medium in ionic contact" refers to a component of an electrochemical device through which ions travel throughout the battery network. The electrolyte is the medium that provides the ion transport capability between the anode and the cathode.

As used herein, "electrochemical stability" refers to the ability of a material to withstand exposure to oxidizing or reducing potentials without substantial degradation.

As used herein, "electroactive material/particle" refers to a material that is involved in the electrochemical reaction of the device. In an electrochemical device, for example, electroactive material is located in the electrodes and participates in the redox reaction of the device, e.g., the release or acceptance of an electron.

"Substantially coats" requires that at least about 50% of the outer surface of the electroactive material is cover or coated, and in some instances, at least about 75% of the outer surface is covered. The coating is uniquely associated with a particle of an electroactive material.

"Electrolyte or electrolyte precursor" includes the electrolyte that is used in the electrochemical device. It also includes a precursor thereto that is used in the assembly of the electrochemical device, but which may be modified in some way after assembly and prior to use. For example, an electrolyte precursor can be crosslinked after the device is assembled to form a solid polymer electrolyte, or an electrolyte may include solvent during assembly which is removed by drying or evaporation after assembly. Optionally, a liquid electrolyte may be added to the device prior to use.

As used herein, "low refractive index material" of an electrochemical device comprising electrodes and an electrolyte generally means a material having a refractive index that is lower than that of the electrolyte, or a precursor thereof, and also lower than that of the electroactive material of the one of the electrodes. Typically, a low refractive index material has a refractive index less than 2.0, less than 1.5, less than 1.4, or less than 1.35.

As used herein, "repelling" or "repulsive" force is understood to mean surface forces that cause dissimilar materials to be repulsive. Thus, the first and third components of a three component system (e.g., cathode, electrolyte, and anode as first, second, and third components, respectively) can be prevented from making direct contact by an intervening or wetting layer of at least molecular dimensions (greater than about 1 nm) of the second component. Measurements of such forces can be made using an atomic force microscope (e.g., "Direct Measurement of Repulsive van der Waals interactions using an Atomic Force Microscope," *Journal of Colloid and Interface Science*, 180: 460–5 (1996)). In such measurements, a particle of one of the components (e.g., a cathode particle) is attached to the tip of an atomic force microscope. The tip is then lowered towards a surface comprised of material from the other component (e.g., an anode particle or film). By measuring the relative displacement of the cantilevered atomic force microscope tip, repulsive forces can be distinguished from attractive forces.

As used herein, "mechanofusion" refers to a process wherein particular materials are subject to a shear force in an apparatus by differential motion between nominally concentric cylinders. The particles are then trapped between the wall and a rotating inner head; the shearing force the particles experience in this gap causes them to fuse together. The resulting partially fused (coated) particles are constantly recycled to obtain uniform surface coverage. When used for encapsulating electroactive particles according to the present invention, this process encourages the formation of encapsulated electroactive particles having a more uniform aspect ratio, as the shearing force also smoothes the finished particles.

As used herein, "plurality" refers to more than one.

As used herein, the singular forms "a", "an" and "the" specifically also encompass the plural forms of the terms to which they refer, unless the content clearly dictates otherwise.

An "electronic device" or an electrochemical device is a device that has two conductive electrodes and an electrically insulating medium separating the two electrodes. Nonlimiting examples of electronic devices include batteries, capacitors, diodes, and photovoltaic devices.

A lithium ion battery will be used to generally describe the various aspects of the present invention. The lithium battery is charged by applying a voltage between the electrodes, which causes lithium ions and electrons to be withdrawn from lithium hosts at the battery's cathode. Lithium ions flow from cathode to anode through electrolyte and are reduced at the anode. During discharge, the reverse occurs; lithium is oxidized to lithium ions at the anode, while lithium ions and electrons enter lithium hosts at the cathode. Discharge is typically an energetically favorable process that drives electrons through an external circuit, thereby supplying electric power to a device to which the battery is connected.

Thus, during battery operation, for example, lithium ions pass through several steps to complete the electrochemical reaction. Typically, the steps include dissolution of lithium at the anode surface, which typically releases an electron to the external circuit; transport of the lithium ions through the electrolyte separator (which can reside in pores of a separator and, in the case of porous electrodes, in the electrodes' pores); transport of the lithium ions through the electrolyte phase in a composite cathode; intercalation of the Li ions into the active cathode material, which typically receives electrons from the external circuit; and diffusion of lithium ions into the active material along with electron transport from a current collector to the intercalation sites.

A metal foil or fine mesh current collector made of, for example, aluminum or copper, can be used as the substrate upon which layers are deposited. Aluminum is preferred when the cathode compound forms a first continuous layer and copper is preferred when the anode forms a first continuous layer. After sequential deposition is complete, the assembly is dried and, optionally, heated for consolidation, a second current collector can be applied to the surface of the layered battery. Optionally, the top current collector is formed by printing as a conductive ink, using techniques for forming patterned interconnects known in the art of electronic device fabrication. Optionally, the electrodes are deposited on an insulating film such as, but not limited to, polyethylene or polyester, from which the battery can be subsequently removed and current collectors can be applied to form contacts with the anode and cathode.

In one aspect, the present invention provides an electrically conductive system that increases the electronic conductivity of an electrochemical device without compromising ionic conductivity. In battery structures having dendritic structures and interpenetrating networks, the criteria for maximizing energy density and power density for a given set of anode, cathode, and electrolyte materials have been determined to include a "balanced" device with nominally equal capacities of the anode and cathode, and optionally a slightly higher anode capacity (e.g., 1%, 5%, or 10% higher capacity than the cathode); a maximum of electroactive material (anode and cathode) in relation to the electrolyte and other non-electroactive materials; a minimum distance between the anode and cathode; and a maximum electronic conductivity within the anode and cathode networks.

The present invention meets these and other criteria, in part or in whole, by using electrode encapsulant materials and electrode systems to provide high energy and power density to an electrochemical device. The electrochemical devices, electrodes, and precursor materials described herein use encapsulant materials to impart electrochemical stability, ionic conductivity, electronic conductivity, and surface force characteristics to an electrochemical device. The electrochemical device can, but is not limited to, be a self-organizing device, such as the self-organizing battery system (SBS) described in co-pending application U.S. Ser. No. 10/206,662 (U.S. Patent Publication No. 2003/00099884), which is incorporated herein by reference, or a conventional battery system. Self-organizing particulate structures can be used for energy storage or energy conversion systems including, but not limited to, primary (disposable) and secondary (rechargeable) batteries, capacitors, diodes, and hybrid electrochemical capacitors.

The electrode encapsulant materials and designs of the present invention are shown in FIG. 1A–1E. Referring to FIG. 1A, in some embodiments of the invention, an electroactive particle 10 is encapsulated with an electrically conductive material 12 to form a continuous layer on the outer surface of the electroactive particle to form a coated particle 1. The electrically conductive material 12 provides the desired properties of electronic conductivity, ionic conductivity, refractive index, and electrochemical stability for the production of composite electrodes. In some embodiments, the coating has an electronic conductivity greater than 2 S/cm and a Young's Modulus less than about 100 GPa. In some embodiments, the coating has an electronic conductivity greater than 2 S/cm and a Young's Modulus greater than about and is substantially free of elemental carbon.

In some embodiments, as shown in FIG. 1B, a particle of electroactive material 10 is coated with a layer of a low refractive index material 14 in which electrically conductive material 12 has been deposited throughout to create conductive paths between the surface of the electroactive material and the exterior of the coating. The low refractive index material modifies the surface properties of the coating to provide repulsive forces, i.e., the Hamaker constant $A_{123}$, which is a measure of interparticle forces, is negative.

In other embodiments, as shown in FIG. 1C, the electroactive material 10 is coated with a multi-phase system having a first phase of electrically conductive material 14 and a second phase of low refractive index material 12 form a layer around a core of electroactive material. The low refractive index material 14 provides an "average" refractive index for the layer that is less than the electroactive material 10.

As shown in FIG, 1D, in some embodiments, the electrically conductive material 12 is dispersed within a phase of low refractive index material 14, to form a layer around the electroactive particles 10. In some embodiments, the layer provides a network of electrically connected conductive material 12 occupying a region between particles of a low refractive index material 14, or alternatively, the layer can be a network of electrically connected low refractive index material occupying a space between particles of a conductive material (not shown).

In still other embodiments, as shown in FIG. 1E, perforations or channels 16 are located in either the first or second phase material. Perforations 16 can extend the through the thickness of the coating layer to create a conduit from the electroactive material core to the outer surface.

Although the encapsulating layers have been described as a layer uniquely associated with a particle, it is also contemplated that the layer is used to coat an electroactive film. In this embodiment, a thin film (e.g., thin film metal) electrode is used and a coating is deposited on an outer surface of the electroactive material to improve, alter or modify the electrode properties as described herein. Furthermore, the device may be other than an electrochemical cell. For example, the device may be a capacitor, in which case the material separating the two electrodes is insulating.

The encapsulated particles are used to make electrodes and electrochemical devices having optimized electrochemical stability, ionic conductivity, electronic conductivity, and surface force characteristics.

Electrochemical stability is demonstrated by the ability of the materials to reproducibly withstand voltages against lithium. In some embodiments, the components of the encapsulant are able to reproducibly withstand potentials against lithium of greater than about 4 volts, and particularly, above 4.2 volts if used on the cathode side and less than about 0 volts on the anode side.

Although ionic conductivity is largely dependent on the thickness of the coating film, as calculated using mass transfer equations known in the art, for relatively "thin" encapsulants (having a thickness of less than about 1 micron), it is desirable that the ionic conductivity of the encapsulant be greater than about $10^{-7}$ S/cm for most standard uses in electrochemical devices.

Electronic conductivity is dependent on the encapsulant thickness, the target network conductivity to achieve high power density, the conductivity of the cathode particle, and the particle shape. Coating thickness and the required electronic conductivity of the coating can be calculated through mathematical modeling of parameters of an encapsulated particle, such as particle size, particle distribution, electroactive material properties, and the target conductivity of the electrode network.

While not wishing to be bound by theory, and referring to FIG. 2, it is postulated that, if the electroactive particle is a sphere with a large area grain to grain contact, having a diameter of about 2 micron, and a conductivity of about 0.3 S/cm is desired, as is typical for a conventional battery, and the thickness of the encapsulant coating is about 50 nm, the encapsulant layer will need to have an electronic conductivity of about 4 S/cm. As will be appreciated by one of skill in the art, non-spherical coated electroactive particles of relatively simple three-dimensional geometry such as cubes, or those that approximate spherical form, would exhibit a similar relationship, and are within the scope of the invention. For the above model, the electroactive particles were assumed to be spheres because they provide a conservative measure of the level of conductivity required, since the tortuosity that exists around the spherical particles creates a longer conductive path that generally requires higher conductivity.

Figure 3:
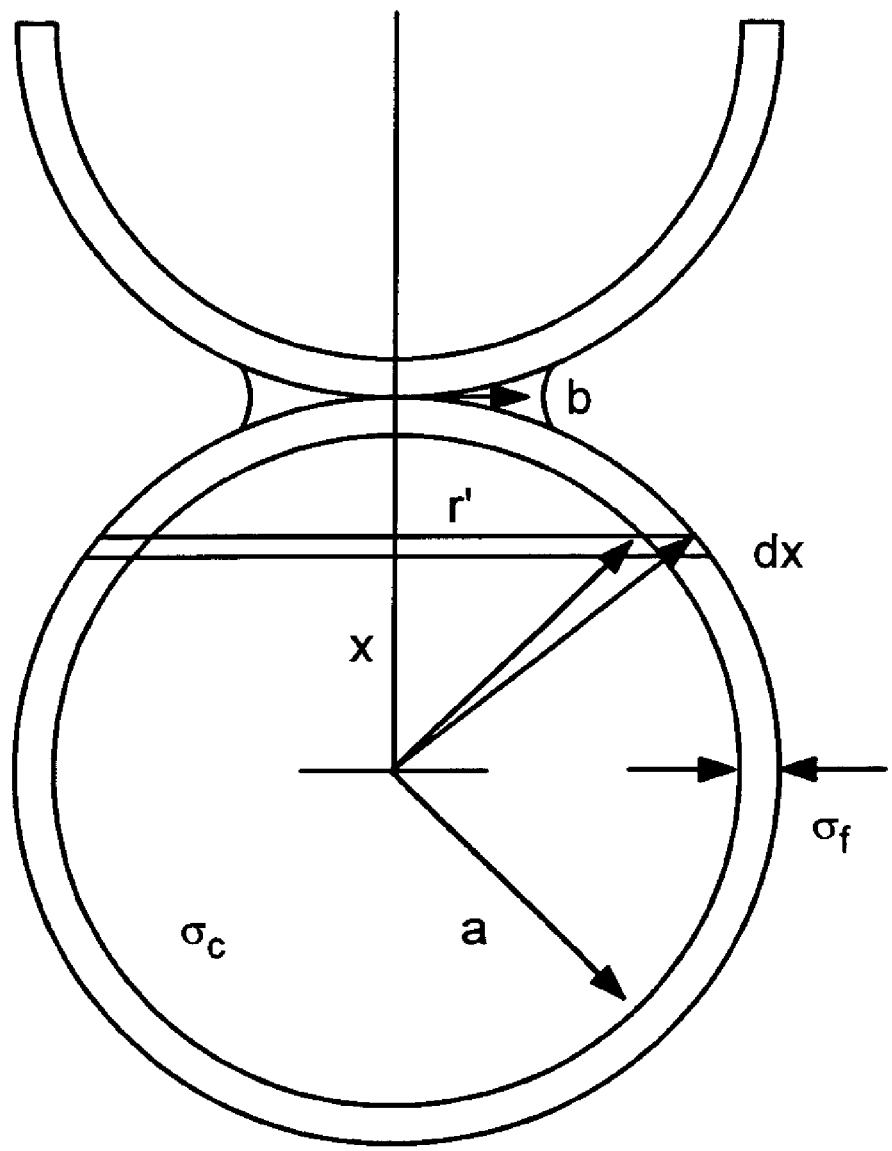
FIG. 3 is a schematic illustration of two adjacent encapsulated electroactive particles according to one embodiment of the invention. The surface-to-surface interface between the two particles is characterized by a neck area having a radius, r, which provides a continuous path for electronic conductivity between the adjacent particles.
Figure 4:
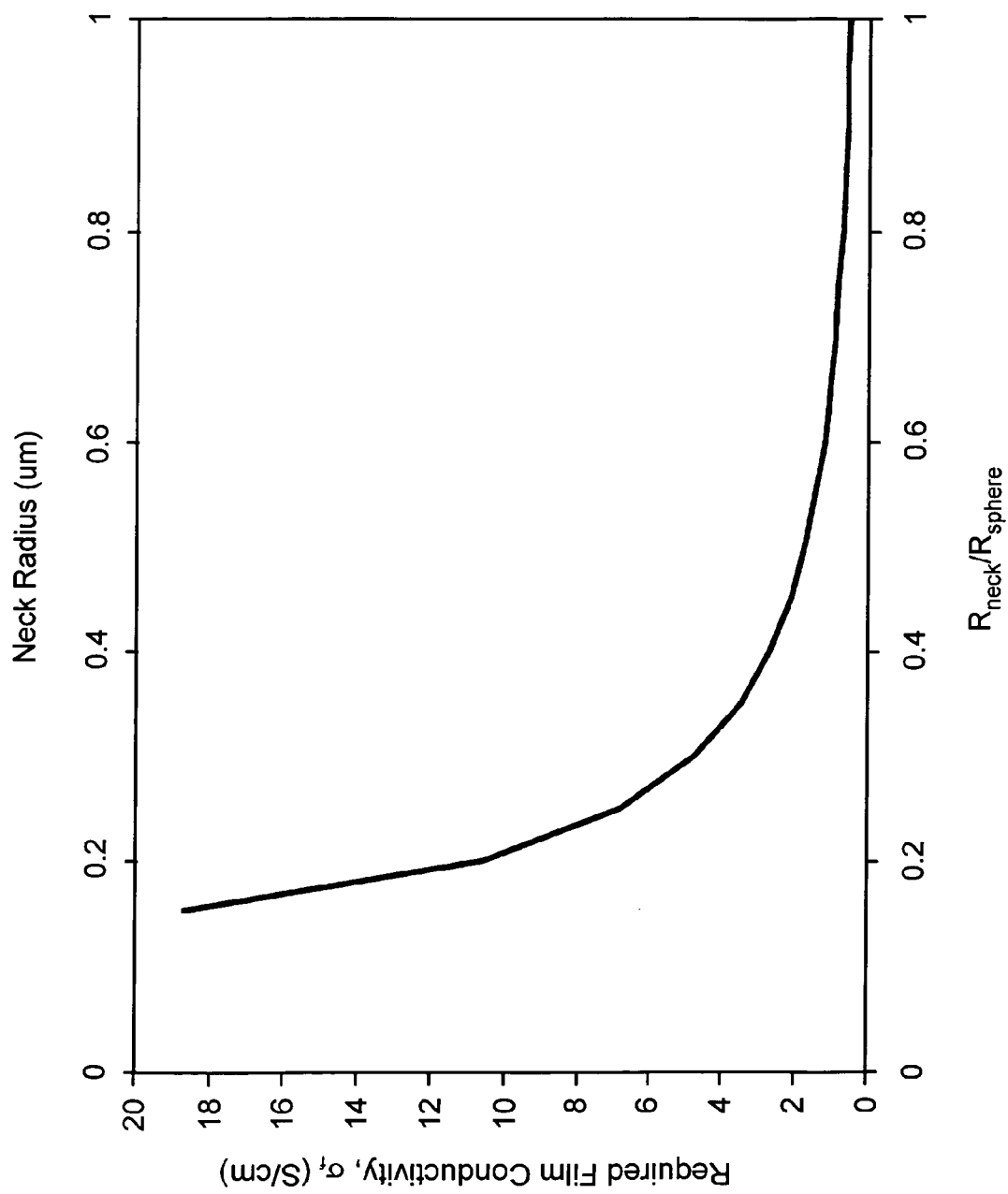
FIG. 4 is a graph showing the relationship between the radius of the neck area at the interface between two adjacent encapsulated electroactive particles and the level of conductivity of the coating material required to attain a desired conductivity throughout a network of coated electroactive particles.

Referring to FIG. 3, it was observed that the self-attractive forces that exist between coated electroactive particles result in a deformation effect at the surface interface between two adjacent coated electroactive particles. This deformation, which may also occur as the result of the application of external forces such as thermal energy or mechanical stresses, creates a neck area of encapsulant material that reduces the conductive path required around the surface of the spheres, and thus decreases the required conductivity of the encapsulant material. FIG. 4 graphically illustrates this relationship for a sphere having a radius of 1 micron, a sphere conductivity of 0.1 S/cm, and a desired network conductivity of 0.3 S/cm. As shown in FIG. 4, for a coating thickness of 50 nm and neck radius of 0.3 microns, the required conductivity of the coating is 5 S/cm. If the neck radius is doubled to 0.6 microns, the required conductivity of the coating decreases to 1 S/cm for the same coating thickness of 50 nm.

According to one or more embodiments, an electrochemical device structure is provided wherein power density is no longer limited by transport through the pore network of the electrode, but by diffusion between particles. The increase in power density over prior art designs of such an embodiment can be estimated from the characteristic lithium ion diffusion time for complete charge or discharge, given by $Dt \propto x^2$, where x is the ion diffusion length and D is the lithium ion diffusion coefficient in the electrolyte phase. In a conventional battery design the diffusion length is the electrode thickness multiplied by a tortuosity factor for the pore network and is at least 100 μm. Thus, the present invention, in one or more embodiments, reduces the characteristic diffusion length to the interparticle separation, or renders lithium diffusion in the storage compound the rate-limiting transport step. The diffusion length is then a few microns or as little as several nanometers. The power density can increase by more than a factor of 10 or more over current designs, typically having power density values of 300 W/kg. High electrical conductivity of the network of electroactive particles or layers is a factor in achieving these high levels of power density.

In addition to improving power and energy densities, another consideration in the design of electrochemical devices, particularly self-organizing battery structures, is that the materials selected for the cathode and the anode possess desired dispersion forces. Many of the electrode structures described herein can be fabricated using self-organization. The selection of materials that exert attracting forces, for like-like particles or bodies, and repelling forces, for like-unlike, particles or bodies, produces self-organizing structures, specifically, self-organizing bipolar devices. The size-scale of the self-organizing entities of the invention can range from a high molecular weight molecule (e.g., MW>1,000,000) to a micron-scale particle and beyond. Surface forces can be used to self-organize a wide range of electrochemical devices including, for example, batteries, capacitors, electrochromics, fuel devices and hybrid devices.

For self-organizing battery structures, in particular, it is desired that the encapsulant have surface force characteristic such that it is attracted to similarly encapsulated particles and repulsed from unencapsulated particles. The principles of surface forces as they affect the organization of bipolar devices may be explained from both a mathematical and an empirical standpoint. Interaction forces may be measured empirically using atomic force microscopy. They may also be quantified mathematically. Van der Waals (vdW) forces between molecules and condensed phases can be composed of three contributions, a Keesom force due to interactions between oriented permanent dipoles, a Debye force due to polarization induced in other molecules by a permanent dipole, and a London dispersion force due to polarization induced in other molecules by oscillations in the electron cloud of interatomic bonds. Of these, the London dispersion force is the most universal because it does not require the existence of permanent dipoles.

An important parameter scaling the dispersion force is the Hamaker constant, A. For symmetric combinations of materials (e.g., a combination of material 1 followed by material 2, followed by material 1) the Hamaker constant $A_{121}=A_{212}$ is typically positive, leading to an attractive dispersion force ($F_{vdW}$<0). For asymmetric combinations of 123 (such that exists when two electrode materials 1 and 3 and an electrolyte 2 comprise an electrochemical device), the dispersion force can be either attractive or repelling. For most materials, and especially low refractive index materials (n<2), the dominant interactions occur in the optical frequency range. The Hamaker constant can be approximated to good accuracy using optical index and static dielectric constant approximations, the widely used form of which is:

$$A_{123} \equiv \frac{3}{4}kT\left(\frac{E_1-E_2}{E_1+E_2}\right)\left(\frac{E_3-E_2}{E_3+E_2}\right) + \frac{3}{8}\frac{h\nu_e}{\sqrt{2}}\frac{(n_1^2-n_2^2)(n_3^2-n_2^2)}{(n_1^2+n_2^2)^{1/2}(n_3^2+n_2^2)^{1/2}\{(n_1^2+n_2^2)^{1/2}+(n_3^2+n_2^2)^{1/2}\}}$$

The electric frequency $v_e$ corresponds to the mean ionization frequency of the materials present. Typically this is $v^e \approx 3 \times 10^{15}$ Hz. k is the Boltzmann's constant and h Plank's constant. T is temperature. The refractive indices in the visible range for mediums 1, 2, and 3 are $n_1$, $n_2$, and $n_3$, respectively. It is understood that the refractive index of materials varies with the frequency of the transmitted radiation. Where refractive index is referred to herein, it is understood to mean the index at a frequency in the visible spectrum. $E_1$, $E_2$, $E_3$ are the static relative dielectric constants. The first term gives the zero frequency energy of the van der Waals interaction and includes the Keesom and Debye dipolar contributions. For two non-polar media acting over a third medium, the first term is not significant.

When the indices are ordered as $n_1 > n_2 > n_3$ or $n_1 < n_2 < n_3$, $A_{123}$ is negative. Thus, the sign and magnitude of the Hamaker constant can be readily estimated from optical and dielectric data, while more precise quantification, where necessary, is possible with full-spectral methods.

Thus, for two dissimilar materials, 1 and 3, separated by a medium, 2, the vdW interaction can be rendered repelling through the judicious selection of materials characterized by a negative Hamaker constant $A_{123}$. The vdW interaction between particles of like material separated by any other medium is attractive. That is, the Hamaker constant for a symmetric assembly of materials $A_{121}$ or $A_{323}$ is positive.

At a sufficiently high volume fraction of such particles and in the absence of unwanted coulombic or steric repulsion, percolative contact between like particles can occur. If the particles are individually electrically conductive, a continuous electrically conducting network results. Zallen, *The Physics of Amorphous Materials*, J. Wiley & Sons, N.Y. (1983) explains that for identically-sized non-interacting spheres packed in three dimensions, percolation occurs at sixteen volume percent packing. In the presence of attractive vdW forces, percolation is expected at lower volume fractions. Thus, in battery systems, where the volume fraction of each storage compound should be maximized for maximum energy density, a percolative network of materials 1 and 3 can form naturally when material 1 is separated from material 3 by material 2.

For systems in which London dispersion forces dominate particle interactions over short length scales (i.e., up to a few microns), the Hamaker constant and the Tabor Winterton approximation given above may be used to select encapsulant materials. In such a system, it is desired that the refractive index (n) of the encapsulant be sufficiently low such that $n_{encapsulant} < n_{electrolyte}(+\text{solvent (optionally)}) < n_{unencapsulated\ electroactive\ material}$.

Numerous combinations of materials 1, 2 and 3 can be selected to provide a self-organizing system. Table 1 lists several exemplary materials and combinations of materials 1, 2 and 3, which can be selected to provide a self-organizing system, but is not meant to be exhaustive.

TABLE 1

Dispersion Force-Based Material Selection

| System | Material 1 (Cathode) | Material 2 (Separator/Electrolyte) | Material 3 (Anode) |
|---|---|---|---|
| 1 | LiCoO$_2$<br>Mg-doped LiCoO$_2$<br>LiMn$_2$O$_4$<br>LiMnO$_2$<br>LiNiO$_2$ | Poly(ethylene oxide) (PEO)<br>Poly(ethylene glycol) (PEG[7])<br>poly(styrene) (PS)<br>Poly(acrylonitrile) (PAN)<br>(each of the above may optionally be doped with a lithium salt for Li$^+$conductivity)<br>PEO or PVDF dissolved in a high refractive index solvent such as diiodomethane, 1,3-diiodopropane, N,N-dimethylformamide (DMF), bromobenzene, cyclohexane, or dimethylpropylene urea (DMPU), the solvent being subsequently evaporated and an organic liquid electrolyte being infused. | Mesocarbon microbeads (MCMB) or, an un-lithiated metal anode, such as Sn, Zn, Al, or Si, in each case coated with:<br>POMA/PVDF or<br>POTh/PVDF |
| 2 | Cathodes as in System 1, coated with:<br>POMA[1]/PVDF[2]<br>POTh[3]/PVDF<br>PEDT[4]/PTFE<br>PEDT/PP[5]<br>PEDT/HDPE[6] | Same as in System 1 | Mesocarbon microbeads (MCMB)<br>An un-lithiated metal anode, such as Sn, Zn, Al, or Si |
| 3 | LiFePO$_4$<br>LiFe$_2$(SO$_4$)$_3$,<br>V$_6$O$_{11}$<br>V$_2$O$_5$ | Same as in System 1 | Mesocarbon microbeads (MCMB)<br>a lithiated metal anode such as Li, LiAl, Li$_3$Al, LiZn, LiAg, |

TABLE 1-continued

Dispersion Force-Based Material Selection

| System | Material 1 (Cathode) | Material 2 (Separator/Electrolyte) | Material 3 (Anode) |
|---|---|---|---|
| 4 | LiFePO$_4$<br>Li$_2$Fe$_2$(SO$_4$)$_3$,<br>V$_6$O$_{11}$<br>V$_2$O$_5$ | Li$_2$OB$_2$O$_3$-Bi$_2$O$_3$ glass<br>Li$_2$O-B$_2$O$_3$-PbO glass | Li$_{10}$Ag$_3$, Li$_5$B$_4$, Li$_7$B$_6$, Li$_{12}$Si$_7$,<br>Li$_{21}$Si$_8$, Li$_{13}$Si$_4$, Li$_{21}$Si$_5$, Li$_5$Sn$_2$,<br>Li$_{13}$Sn$_5$, Li$_7$Sn$_2$, Li$_{22}$Sn$_5$, Li$_2$Sb,<br>Li$_3$Sb, LiBi, or Li$_3$Bi,<br>Mesocarbon microbeads<br>(MCMB)<br>a lithiated metal anode such as<br>Li, LiAl, Li$_3$Al, LiZn, LiAg,<br>Li$_{10}$Ag$_3$, Li$_5$B$_4$, Li$_7$B$_6$, Li$_{12}$Si$_7$,<br>Li$_{21}$Si$_8$, Li$_{13}$Si$_4$, Li$_{21}$Si$_5$, Li$_5$Sn$_2$,<br>Li$_{13}$Sn$_5$, Li$_7$Sn$_2$, Li$_{22}$Sn$_5$, Li$_2$Sb,<br>Li$_3$Sb, LiBi, or Li$_3$Bi, |
| 5 | Cathodes as in System<br>1, coated with:<br>Vanadium oxide<br>Hydrated vanadium<br>oxide<br>Vanadium oxide-PEO<br>blend<br>Vanadium-boron-oxide<br>Vanadium-silicon-<br>oxide<br>Vanadium-phosphorus-<br>oxide | Same as in System 1 | Mesocarbon microbeads<br>(MCMB)<br>An un-lithiated metal anode,<br>such as Sn, Zn, Al, or Si |

[1] Poly(2-methoxy aniline)
[2] Poly(vinylidene fluoride)
[3] Poly(3-octylthiophene)
[4] Poly(3,4-ethylene dioxythiophene)
[5] Polypropylene
[6] High Density Polyethylene
[7] Polyethylene glycol The materials selected to prepare the electrodes and electrochemical devices of the invention take into account the interactive forces described above, to achieve the desired surface force characteristics.

The electrochemical devices of the invention are generally composed of an anode, an electrolyte, and a cathode, as described above. In some embodiments, the particles of the electrodes are composed of electroactive material substantially coated with a conductive material. In some embodiments, the coating associated with the electroactive material also includes a low refractive index material.

The electrochemical device includes a first electrode in electronic communication with a first current collector, a second electrode in electronic communication with a second current collector, and an electrolyte in ionic contact with the first and second electrodes. At least one of the first and second electrodes includes a plurality of electrically connected coated particles, which are made up of an electroactive material and a layer that substantially coats an outer surface of the electroactive material. In some embodiments, the layer includes sufficient low refractive index material that the refractive index of the layer is less than that of the electrolyte or an electrolyte presursor. In some embodiments, the layer includes conductive material having an electronic conductivity greater than about 2 S/cm and a Young's modulus less than about 100 GPa. In some embodiments, the layer includes conductive material having an electronic conductivity greater than about 2 S/cm and is substantially free of elemental carbon. In some embodiments, the particles of one electrode exert a repelling force on the other electrode when combined with the electrolyte or an electrolyte precursor. In some embodiments, the dispersion force between particles of one electrode are repulsive with respect to particles of the other electrode when combined with the electrolyte or its precursor.

In some embodiments, the electrochemical device includes a separating medium in contact with the first and second electrodes. The separating medium can be insulating or conductive. In some embodiments, the separating medium is a dielectric medium.

Electrodes for use in conjunction with an electrolyte or its precursor in an electrochemical device include a plurality of electrically connected coated particles that include an electroactive material and a layer that includes conductive material substantially coating an outer surface of the electroactive material. The Hamaker constant of the second layer and the electroactive in the presence of an electrolyte or an electrolyte precursor is negative. In another embodiment, the layer includes a conductive material and sufficient low refractive index that the refractive index of the layer is less than that of the electrolyte or an electrolyte precursor thereof. The electrodes of the invention can include a first layer (e.g., a film) having an electroactive material and a second layer of conductive particles deposited on the surface of the first layer comprising conductive particles having a conductivity greater than 2 S/cm and a Yong's modulus less than about 100 GPa. In some embodiments, the second layer has a refractive index lower than a refractive index of the electroactive material and lower than the refractive index of the electrolyte or its precursor.

The electroactive material of the first and/or second electrode can be a lithium intercalating material. As will be appreciated by one of ordinary skill in the art, a variety of lithium intercalation compounds may be used as the electroactive material for the present invention, including but not limited to oxides such as Li$_x$CoO$_2$, Li$_x$NiO$_2$, Li$_x$Mn$_2$O$_4$, and $Li_xV_6O_{13}$. In addition, sulfides such as $Li_xTiS_2$ and other disulfides may be used as the electroactive material. Systems with multiple metals have been described in several patents and publications. Ohzuku, et al., "Synthesis and Characterization of $LiAl_{1/4}Ni_{3/4}O_2$ for Lithium-Ion (Shuttle Cock) Batteries," *J. Electrochem. Soc.*, vol. 142, p. 4033 (1995), and Chiang et al., "High Capacity, Temperature-Stable Lithium Aluminum Manganese Oxide Cathodes for Rechargeable Batteries," *Electrochem. Sol. St. Lett.*, 2(3) pp. 107–110 (1999) describe the mixed-metal composition of the title and report electrochemical properties thereof.

In some embodiments, the first electrode of the electrochemical devices of the invention is a cathode and the electroactive material can include, but is not limited to, one or more of $LiCoO_2$, $Li(Mg_xCo_{1-x})O_2$, $LiNiO_2$, $LiMn_2O_4$, $LiMnO_2$, $Li(Al_xMn_{1-x})O_2$, $LiFePO_4$, $LiMnPO_4$, $Li_2Fe_2(SO_4)_3$, $V_2O_5$, $V_6O_{11}$ or other such cathode-active materials well-known to those skilled in the art.

In some embodiments, the second electrode of the electrochemical devices of the invention is an anode which include, but is not limited to, one or more of C, amorphous carbon, graphite, mesocarbon microbeads (MCMB), Li, LiAl, $Li_9Al_4$, $Li_3Al$, Zn, LiZn, Ag, LiAg, $Li_{10}Ag_3$, B, $Li_5B_4$, $Li_7B_6$, Ge, Si, $Li_{12}Si_7$, $Li_{21}Si_8$, $Li_{13}Si_4$, $Li_{21}Si_5$, Sn, $Li_5Sn_2$, $Li_{13}Sn_5$, $Li_7Sn_2$, $Li_{22}Sn_5$, Sb, $Li_2Sb$, $Li_3Sb$, Bi, LiBi, $Li_3Bi$, $SnO_2$, SnO, MnO, $Mn_2O_3$, $MnO_2$, $Mn_3O_4$, CoO, NiO, FeO, $LiFe_2O_4$, $TiO_2$, $LiTi_2O_4$, or Sn—B—P—O compounds and glass compositions thereof.

The electroactive materials used as cathode and anode materials are electrically conductive and naturally tend to have high refractive indices. Thus, without the use of an encapsulated particle having modified surface properties, a negative Hamaker constant is difficult to achieve. Referring to Table 1, coatings can be provided on materials 1 or 3 as a layer that substantially coats an outer surface of the electroactive material. A coating can be used on the cathode electroactive material compound or the anode electroactive material, in order to obtain a repelling dispersion force between the two, using the separator/electrolytes given. Coatings are selected to provide both the desired surface attractive or repulsive forces and adequate conductivity for electrochemical device function.

The layer can include a material with sufficiently low index material such that the refractive index of the layer is less than that of the electrolyte or an electrolyte precursor. The low index material is used in an amount to provide a desired average refractive index of the layer. By way of example, the low index material can make up at least about 50 wt % of the layer. The low refractive index material includes, without limitation, fluorinated polymers, polypropylene, and vanadium oxide. Nonlimiting examples of fluorinated polymers include polytetrafluoroethylene, poly(vinylidene fluoride), fluorinated esters of methacrylic acid (e.g., hexafluoroisopropylmethacrylate, heptafluorobutylmethacrylate, trifluoroethylmethacrylate, and pentafluorobutylmethacrylate), and fluorinated esters of methacrylic acid, and their copolymers and blends. The low index material can have a refractive index less than about 2.0, or less than about 1.5, or less than about 1.4, or less than about 1.35.

The electroactive material also is required to be in electrical communication with the rest of the device in order to function as an electrochemical device. Thus, the layer also is conductive. In some embodiments, the layer includes a conductive material having an electronic conductivity greater than about 2 S/cm. Both the first and second electrodes can include electrically connected, coated particles having a layer that includes a conductive material having an electronic conductivity greater than about 2 S/cm.

In some embodiments the layer is elastic. For example, the Young's modulus of the layer is less than 100 GPa.

In some embodiments, the layer is substantially free of elemental carbon. As used herein. "substantially free" means less than 10%, less than 5%, and less than 1%.

In some embodiments, the layer of the encapsulated particle is prepared as a plurality of particles. The layer of particles includes a network of electrically connected material. The layer can further include particles of a low index material, with the electrically conductive material occupying a region between the particles of the low index material. Adjacent particles of like composition of a coated particle can exert attractive forces such that deformation occurs at a surface contact interface between the adjacent particles.

In some embodiments, the conductive material of the layer is ionically conductive. In some embodiments, the layer includes a conductive material having ionic conductivity of at least about $10^{-7}$ S/cm or at least about $10^{-6}$ S/cm. In some embodiments, the layer includes a conductive material having ionic conductivity of at least about $10^{-5}$ S/cm or at least about $10^{-4}$ S/cm.

In some embodiments, the conductive material of the layer is electronically conductive. In some embodiments, the layer includes a conductive material having electronic conductivity at least about $10^{-2}$ S/cm, at least about $10^{-1}$ S/cm, at least about 1 S/cm, at least about 10 S/cm, and at least about 100 S/cm.

The coating layer can have a thickness of less than about 1 micron, or about 0.1 micron, or less than about 0.05 micron.

The conductive material can be a conductive polymer. Examples of conductive polymers include, without limitation, polyanilines (e.g., poly(2-methoxyaniline)), polythiophenes (e.g., poly(3-octylthiophene), and poly(3,4-ethylene dioxythiophene)), and polypyrroles, and their derivatives. The layer can also include, but is not limited to, blends and copolymers of conductive polymers. Nonlimiting examples of a polymer blend is poly(2-methoxyaniline) ("POMA") or poly(3-octylthiophene) ("POTh") with PVDF or PEO. In some embodiments, the coating material which encapsulates the electroactive material may be a conducting polymer, such as a single polymer, or a polymer blend that includes a conductive polymer and a secondary material (e.g., a fluorinated polymer). Nonlimiting examples of such blends are poly(3,4-ethylene dioxythiophene)("PEDT") or poly(3,4 ethylene dioxythiophene)-polystyrene sulfonate ("PEDT-PSS"), where the secondary material includes polytetrafluoroethylene ("PTFE") or derivatives thereof or poly (vinylidene fluoride)("PVDF"). In other embodiments, the coating layer includes at least one polytetrafluoroethylene, poly(vinylidene fluoride) and poly(ethylene oxide).

The electrically conductive material can also be one or more of the following compounds: pure elements metal oxides, metal sulfides, carbon, and conductive polymers. Exemplary conducting elements include, without limitation, carbon black, lithium, nickel, and zinc. Exemplary conductive polymers include without limitation polythiophenes, polyanilines, polypyrroles, and polyetheylenes and their derivatives. Nonlimiting examples of such conducting polymers include, without limitation, poly (3-octylthiephene), poly(3,4-ethylene dioxythiophene). Exemplary conductive oxides include, without limitation, vanadium oxide, indium tin oxide compound, titanium oxide, manganese oxide, nickel oxide, or their alloys.

The coating material can include a dopant that improves the conductivity of the conducting material. The dopant can be, but is not limited to, a counter-ion source including, without limitation, polystyrene sulfonate, hydrochloric acid, or a lithiated compound, tosylate ion, camphorsulfonic acid, dodecylbenzene sulfonic acid, perfluorodecane sulfonic acid, trifluoroacetic acid, or perchloric acid.

The coating can also include a filler material, which is dissolvable upon contact with an electrolyte solution.

Referring to Table 1, the electrolyte, material 2, is selected to provide a repelling dispersion force or to wet between materials the cathode, 1, and the anode, 3, even in the absence of a coating. The separator/electrolyte can be an inorganic glassy material selected to have sufficiently high refractive index to provide a repelling dispersion force between the cathode and anode compounds, as well as sufficiently high lithium ionic conductivity and low electronic conductivity to act as an electrolyte.

The electrolyte material may be a solid polymer electrolyte such as polyethylene oxide ("PEO"), or other solid, gel, or liquid electrolyte known in the art. A solid polymer electrolyte, for example, may serve as a binder that, in some instances, serves to bind the particles securely together in the assembled device while allowing liquid electrolyte to be infused (flooded) throughout the battery. A nonlimiting example of suitable solid polymer electrolyte includes, without limitation, polyethylene oxide in which a lithium salt such as lithium perchloric acid or lithium triflate has been added. A nonlimiting example of a binder and liquid electrolyte that remains dimensionally stable (i.e., the electrolyte does not dissolve the binder) is poly(vinylidene fluoride) (PVDF) and ethylene carbonate-dimethyl carbonate (EC:DMC) in a 1:1 molar ratio, to which a lithium salt has been added.

In some embodiments, the electrolyte includes organic materials, such as, but not limited to, one or more of the following polyethylene oxide (PEO), polystyrene (PS), polyacrylonitrile (PAN), polyvinylidene fluoride (PVDF), ethylene carbonate (EC), diethylene carbonate (DEC), dimethyl carbonate (DMC), propylene carbonate (PC) and block copolymer electrolytes. A lithium salt is added to provide lithium ionic conductivity. Such lithium salts include, without limitation, $LiClO_4$, $LiPF_6$, $LiAsF_6$, $LiHgI_3$, $LiCF_3SO_3$ and $LiBF_4$. In some embodiments, the electrolyte includes, without limitation, inorganic materials such as LiI, LiF, LiCl, $Li_2O$—$B_2O_3$—$Bi_2O_3$, $Li_2O$—$B_2O_3$—$P_2O_5$ and $Li_2O$—$B_2O_3$—PbO, and glass compositions of the following: $Li_2O$—$B_2O_3$—$Bi_2O_3$, $Li_2O$—$B_2O_3$—$P_2O_5$ and $Li_2O$—$B_2O_3$—PbO. In other embodiments, the electrolyte includes a sol or gel of the oxides or hydroxides of Ti, Zr, Pb, Bi, Mo, W, Si, Ge, Al, B, or P.

The precursor to the electrolyte may be the constituent molecules in liquid form, or the electrolyte materials dissolved in a processing solvent.

The encapsulant material of the electrodes is prepared from a polymer composition having a homogeneous mixture of a conductive polymer and a low refractive index polymer where the composition is polymer latex, a dispersion or a solution. A polymer latex is an aqueous dispersion of polymer particles. In one nonlimiting example, a composition includes a conductive polymer and a low refractive index polymer, such as highly fluorinated polymer (e.g., PTFE or PVDF). The composition can also include a conductive material, such as a conductive polymer, a conductive oxide, or pure elements. Exemplary conductive polymers include, without limitation, polyanilines, polythiophenes, polypyrroles, polyethylenes, nonlimiting examples of which are listed above. Exemplary conductive oxides include, without limitation, vanadium oxide, indium tin oxide compound, titanium oxide, manganese oxide, nickel oxide, or their alloys. In some embodiments, the polymer dispersion or solution composition includes a polymer blend of a conductive polymer and a low refractive index polymer. Exemplary pure elements include, without limitation, carbon, carbon black, lithium, nickel, and zinc.

The solids content of the polymer composition is typically greater than 1 wt %, and can be 10 wt % or more. The low index material typically makes up more than one-half of the solids content and can be up to about 90% of the solids content of the latex or more. Actual amounts will vary, depending upon the materials and the performance requirements of the electrochemical device.

The polymer composition can include a coalescing agent, e.g., a film-forming material in which either the low index or conductive material is soluble. Nonlimiting examples of coalescing agents are N-methyl-2-pyrolidinone, glycol ethers and derivatives thereof, glycol ether acetates, and dibutylphthalate. Exemplary glycol ethers, derivatives, and acetates include, without limitation, diethylene glycol monomethyl ether (Methyl Carbitol™, Dow), triethylene glycol monomethyl ether (Methyl Carbitol™, Dow), ethylene glycol monopropyl ether (Propyl Cellosolve™, Dow), ethylene glycol monobutyl ether, diethylene glycol monobutyl ether, triethylene glycol monobutyl ether, ethylene glycol monohexyl ether, diethylene glycol monohexyl ether, ethylene glycol n-butyl ether acetate, diethylene glycol n-butyl ether acetate.

While not being bound by any particular theory of operation, it is believed that the coalescing agent softens the conductive polymer by solubilizing at least the outer portion of the polymer particles. The softened particles can deform when brought into contact with one another to thereby increase the interparticle contact area. The increased interparticle contact improves the mechanical strength and, in the case of the conductive material, the percolative conductive pathway in the layer and increases layer conductivity. In addition, the softened particles are better able to occupy the interstitial regions formed by the organization of the hard particle, non-deforming low index particles on the electroactive material surface in some embodiments.

In some embodiments, the precursor material of the electrode is a nonflocculating dispersion of an electrically conductive polymer and a highly fluorinated polymer solution. In some embodiments, the dispersion includes particles of carbon dispersed in a solution of a fluorinated polymer. In some embodiments, the carbon is non-agglomerated, and of uniform particle size.

In some embodiments, the interconnected conductive material in a composite encapsulant has a high refractive index (n>2). In such embodiments, a lateral dimension of the conductive material in the plane of the coating is desired to retain an overall repulsive interaction with the electroactive material in the electrolyte or its precursor. Preferably, this dimension in the plane of the coating is less than 0.2 micron. In some embodiments, the particle dimension of the composite is less than 0.1 micron; in some embodiments, the particle dimension of the composite is less than 0.025 micron. In some embodiments, the precursor material is a dispersion comprising a non-coalescing, non-deforming component; a soluble, polymeric film-forming component; and a conductive component, which is either deformable, in a swollen state, or a colloid of dimensions which can be easily located within the open volume provided by the non-coalescing particles. The conductive component can include metallic colloid or gold particles, in addition to the conductive materials previously mentioned.

The coating materials and encapsulated particles can be prepared according to methods known in the art. For example, conductive oxides may be deposited onto the electroactive layer using sol-gel processes.

In some embodiments, the electroactive material can be modified prior to, during, or following encapsulation to improve properties and performance of the encapsulating layer and the electroactive material. In some embodiments, the surface of the electroactive material is washed to remove contaminants or residual layers (e.g., oxides or carbonates), to adjust pH, or to functionalize the surface of the electroactive material. Once the encapsulating layer is deposited onto the electroactive material, the encapsulating layer can be modified to impart added stability, adhesion, or conductivity. Nonlimiting examples of post-deposition treatment include sintering or washing with acidic or basic solutions to adjust the pH of the encapsulating layer.

Cathode particles can be encapsulated by a blend of low refractive index polymer, such as PVDF, and a conductive polymer such as PEDT, by polymerisation of ethylene dioxythiophene ("EDT") monomer within the PVDF layer surrounding the active particle. For example, the EDT monomer is first mixed with PVDF to form a solution. Particles of electroactive material are mixed into this solution and the whole is sprayed to form fine, well-separated droplets containing cathode particles, the monomer, EDT, salts, and solvent. Upon evaporation of the solvent and heating these particles (which can be done simultaneously with the spraying step, for example by spraying into heated air), the constituents react to form the electrically conductive material PEDT within a phase of the low refractive material (PVDF), which is situated around the electroactive cathode particles.

The cathode grains can be first encapsulated in a shell of low refractive index polymer containing dispersed monomer by spray-drying a dispersion containing cathode grains, low refractive index polymer (e.g., PVDF) and EDT monomer in solvent. These particles are collected in a solution of iron (III)tosylate in water or ethanol and then heated to allow the iron(III) salt to diffuse into the PVDF/EDT shell where it causes polymerisation of the EDT monomer to form conductive PEDT in-situ. The composite particles are then washed to remove salts and dried. The in-situ polymerisation may also be caused to occur in the interstitial spaces between PTFE particles that have been adhered to the active surface.

Either the conductive or low index materials may include a component that dissolves upon exposure to electrolyte solution, water, or other medium, such that perforations, which extend the length of the coating layer, are created. Such components may include, but are not limited to salts, including excess salts of a lithiated compound.

A polymer latex can be prepared by mixing a conductive polymer in an appropriate solvent into a poly(tetrafluoroethylene) latex. Exemplary solvents include, without limitation, water or a fluorinated solvent. Suitable latexes are commercially available, for example, under the trade name Teflon® 5070AN from Dow Chemical Company. A coalescing agent can optionally be added to the solution, to further improve the conductivity. Coalescing agents are chosen for their ability to form a film in which the conductive material is soluble.

The latex can then be used to encapsulate an electroactive material (e.g., lithium cobalt oxide ("LCO")). The LCO can be encapsulated, for example, by spray drying (e.g., electrospray, thermal spray, ultrasonic spray). Alternatively, a variety of methods may be used to deposit the electrically conductive material onto the surface of the electroactive material. Exemplary methods include, without limitation, chemical deposition. (e.g., in situ polymerization or a sol-gel process) or mechanical deposition (e.g., casing, powder coating, fluidized bed coating, dispersion coating, or mechanofusion, agglomaster, or magnetically assisted impact coating ("MAIC"), and physical deposition (e.g., vapor phase or ablation based processes). In the MechanoFusion process, a powder (derived from the dispersion of PTFE/PEDT which has been dried, for example) is intensively mixed with the LCO. The Agglomaster process is a 'Wurster Type' process, in which a fluidized bed of LCO particles is 'sprayed' with a dispersion or solution. The MAIC process is a powder/powder method of encapsulation via the high frequency impact by hard urethane coated micro magnets.

Once the LCO is encapsulated with this material, it is expected that a dispersion of encapsulated LCO in a slurry containing polymeric electrolyte or its precursor and carbon-based anode particles will self assemble into an interpenetrating network of cathodes and anodes. This self-assembly is expected because of the repulsive forces developed between the encapsulated LCO and the carbon anode particles.

A dispersion can be prepared by first forming a solution of a conductive material (e.g., carbon black), a low refractive index material (e.g., PTFE), and a coalescing agent (e.g., NMP). Once the components are combined, they are mixed according art-recognized procedures until homogenously mixed. In some embodiments, sufficient energy needs to be used to disperse agglomerates of either the conductive or low index material in the solvent. For example, mixing can be performed by high energy Spex milling. Alternatively, mixing can be performed by stirring the solution in the presence of glass beads. An electrode is prepared from the resulting dispersion by depositing the solution onto an outer surface of an electroactive material and solidifying it by drying, cooling, cross-linking, or other methods well known in the art. In some embodiments, the electroactive material can be modified prior to, during, or following encapsulation to improve properties and performance of the encapsulating layer and the electroactive material. In some embodiments, the surface of the electroactive material is washed to remove contaminants or residual layers, such as oxides or carbonates, to adjust pH, or to functionalize the surface of the electroactive material. Once the encapsulating layer is deposited onto the electroactive material, the encapsulating layer can be modified to impart added stability, adhesion, or conductivity. Nonlimiting examples of post-deposition treatment include sintering or washing with acidic or basic solutions to adjust the pH of the encapsulating layer. Alternatively, the pH of the initial dispersion or solution can be adjusted to counteract any reactions with the electroactive material to be coated.

Figure 5:
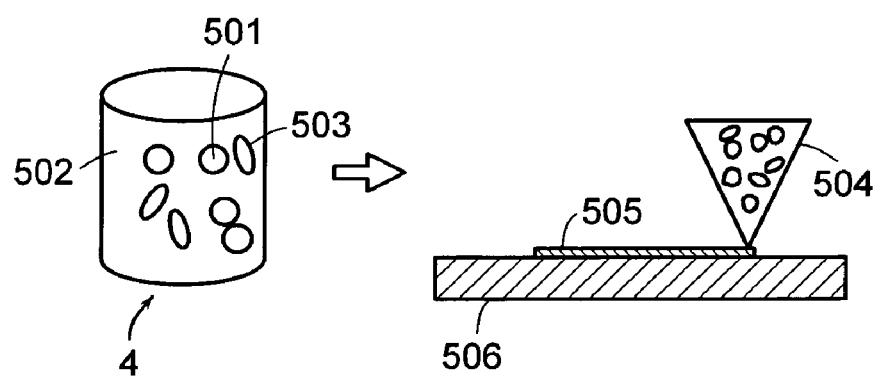
FIG. 5 is a schematic illustration of a process used in the preparation of an electrochemical device using encapsulated electroactive particles.

A method of preparing an electrochemical device is described with reference to FIG. 5. In practice, a salt (Li for a Li-ion battery system) and, if necessary, an appropriate initiator are dissolved in the polymer electrolyte precursor 502. The appropriate anode materials 501 and cathode materials 503 are dispersed in the crosslinkable liquid polymer electrolyte precursor 502, and cast from applicator 504 as a film 505 onto at least one current collector selected or prepared such that the current collector 506 experiences an attractive interaction with the cathode materials 501 and a repulsive interaction with the anode materials 503. A second current collector (not shown) may be applied to the upper surface, which experiences a repulsive interaction with the cathode and an attractive interaction with the anode. Sufficient time is given to allow self organization to take place, i.e. electrical connection via particle motion of the cathode particles to each other and the cathode current collector, and of the anode particles to each other and the anode current collector, as well as separation (and thus electrical isolation) between the anode and cathode particles.

The function and advantage of these and other embodiments of the present invention will be more fully understood from the examples below. The following examples are intended to illustrate the benefits of the present invention, but do not exemplify the full scope of the invention.

EXAMPLES

Example 1

Testing of PEDT-PSS as Conducting Polymer Film

The efficacy of PEDT as a conducting film for encapsulating $LiFePO_4$ cathode-active particles was tested. Slurries were produced containing 1:10 PEDT-polystyrene sulfonate ("PEDT-PSS"):$LiFePO_4$ by adding the $LiFePO_4$ directly to an aqueous dispersion of the PEDT-PSS. Specifically, 100 mg of Nb doped $LiFePO_4$ was added to 773 mg of a 1.3 wt. % aqueous dispersion of PEDT-PSS. The mixture was manually stirred, sonicated, and magnetically stirred to ensure dispersion of the particles. Films were cast on aluminum foil, which acts as the current collector. The films were dried. These cathode films were then assembled in a conventional battery configuration (with plastic mesh separator and LP30 liquid electrolyte) and cycled versus Li. A first cycle discharge capacity of 72 mAh/g was observed at a rate of 1/12 of C-rate. This capacity increased with increasing cycles, reaching 92 mAh/g after 15 cycles.

Example 2

Doping of PEDT-PSS with $LiClO_4$ to Increase Electronic Conductivity

In this prophetic example, 5 wt. % bis(perfluoroethylsulfonyl) imide (BETI, a lithium salt), based on PEDT-PSS solids is dissolved in the aqueous 1.3 wt. % PEDT-PSS dispersion prior to its use as a conductive additive/encapsulant. The incorporation of the lithium salt serves to increase the Li ion conductivity of the PEDT-PSS conductive polymer. BETI is used because it is not readily hydrolyzed, as for example, other dopants such as $LiPF_6$ would be.

Example 3

Electrochemical Stability Testing of PEDT-encapsulated Lithiated Cobalt Oxide

A positive electrode film was prepared by doctor-blade casting of electrode slurry consisting of a PEDT-encapsulated $LiCoO_2$ (3.0 g, provided by Eeonyx Corp.), poly (vinylidene fluoride) (0.3 g, Kynar Flex 741, AtoFina), conductive carbon (0.2 g, Super P, Eurochem), propylene carbonate plasticizer (0.5 g) and acetone solvent (20 ml). The film was densified on a laboratory press at 120° C., the plasticizer extracted with methanol, and the film dried under vacuum. One-$cm^2$ electrode disks were punched out of the obtained electrode film and used to assemble test cells using a highly porous glass fiber disk saturated with a liquid electrolyte solution (1 M $LiPF_6$ in ethylene carbonate: dimethyl carbonate 1:1) as a separator. Disks of metallic lithium were used as a negative electrode. Such test cells were tested galvanostatically by repeated charge and discharge between 3.4 and 4.2 V at a current density of 0.3 mA/$cm^2$. The discharge capacity after 15 charge/discharge cycles (142 mAh/g $LiCoO_2$) compared favorably with the first discharge capacity (145 mAh/g $LiCoO_2$), capacity loss of 0.13%/cycle, thus demonstrating that the PEDT-coated $LiCoO_2$ electrode material is electrochemically stable under typical Li-ion battery operating conditions.

Example 4

Perforated Conductive Encapsulation of Electroactive Particles

In this prophetic example, an excess amount of lithium salts is added to the PEDT-PSS films of Example 1 to create coated electroactive particles. Upon contact with an electrolyte solution, these salts dissolve, leaving perforations in the conductive polymer coating that allows contact of the electrolyte with the electroactive particle, resulting in an effectively increased ionic conductivity. The pores or perforations provide a short-circuit path for lithium ion conductivity.

Alternatively, a second phase material is dispersed with or phase separated from the conductive polymer encapsulating material, which can then be washed, etched, or otherwise removed to leave pores within the encapsulating material. In another embodiment, the conductive polymer that encapsulates the electroactive particle includes a plurality of particles that adsorb to the surface of the electroactive particle leaving small interstices in between adjacent conductive polymer particles. Liquid electrolyte is able to infiltrate these interstices to come into contact with the electroactive particle. In one aspect of this embodiment, a blend of conductive particles (having desired electronic conductivity properties) and non-conductive particles (having desired low refractive index properties) may be used to encapsulate the electroactive particles.

Example 5

A Composite Electrode of $LiCoO_2$ Encapsulated with PEDT-PSS A $LiCoO_2$-PEDT-PSS composite electrode composition containing 3 wt. % PEDT-PSS based on $LiCoO_2$ and 10 wt. % $LiClO_4$ based on PEDT-PSS was produced from the 1.3 wt. % PEDT-PSS aqueous dispersion. This slurry was cast on an Al foil current collector and dried to form a composite cathode film. The cathode film was then assembled in a conventional battery configuration (with plastic mesh separator and LP30 liquid electrolyte) and cycled versus Li. A low rate (1/20 of C rate) first cycle discharge capacity of 69 mAh/g was observed in this system. In contrast, a similar electrode composition containing 6.3 wt. % PEDT-PSS based on $LiCoO_2$ and no salt exhibited no discharge capacity (<5 mAh/g), even at a rate of 1/50 of C-rate.

Example 6

Electroactive Particles Encapsulated with Electrically Conductive and Low Refractive Index Materials A conductive polymer system having a blend of electrically conductive particles (e.g., carbon, PEDT) and low refractive index particles (e.g., PVDF, PTFE) was created for encapsulating lithium based electroactive particles. Specifically, an electrochemical cell using particles (e.g., grains) of $Li_xMn_yCoO2$ ("LMCO") as the cathode-active material was made from a conductive polymer composition comprising a mixture of polytetrafluoroethylene ("PTFE") and poly (3,4 ethylene dioxythiophene)-polystyrenesulfonate ("PEDT-PSS") in the following manner.

A 1.3 wt % aqueous dispersion of PEDT-PSS, (having a particle size of about 30 nm, Baytron-PH, H C Starck) was mixed with an aqueous dispersion of PTFE (having a particle size of about 0.05 to about 0.35 microns, Zonyl PTFE K-20, DuPont). The PEDT-PSS and PTFE particles had been cleansed of residual surfactant by exhaustive dialysis against pure water. A minimum amount of non-ionic, perfluorinated surfactant was then added to aid final dispersion stability. The resulting PEDT-PSS/PTFE mixture was prepared such that the ratio of solids of PEDT-PSS/PTFE was about 1:9. The volume of LMCO powder to be added to this mixture was calculated such that the volume ratio of LMCO:(PEDT-PSS/PTFE) was about 95:5.

A volume of water equal to the calculated volume of LMCO was added to the PEDT-PSS/PTFE mixture to dilute it, then LMCO was added under high shear mixing to produce a well-dispersed mixture. This mixture was calculated to possess a solids loading of about 50% by volume, and mass ratios of LMCO:PTFE/PEDT-PSS of about 95:4.5:0.5. This mixture was spray-dried to form LMCO particles encapsulated with the conductive polymer system comprised of PEDT-PSS and PTFE.

This formulation resulted in LMCO particles encapsulated with a mixture of 90% by weight PTFE and 10% by weight poly(3,4 ethylene dioxythiophene)-polystyrenesulfonate ("PEDT-PSS"). The thickness of the encapsulant was about 35 nm (total volumetric loading of about 5%). By the rule of mixtures, a 90:10 blend of PTFE (Teflon®) and PEDT (Baytron® P) has a refractive index of about 1.36 (based on the refractive index of PTFE ~1.35 and that of PEDT of ~1.4 as per literature). The encapsulant has a conductivity of about $10^{-5}$ S/cm.

TABLE 2

Formulation prepared according to Example 6.

| Ingredient | Density | Wt % | Mass | Mass active | Mass water | Volume active |
|---|---|---|---|---|---|---|
| PEDT-PSS | 1.1 | 0.013 | 1 | 0.013 | 0.987 | 0.011818182 |
| PTFE latex | 2.2 | 0.6 | 0.195 | 0.117 | 0.078 | 0.053181818 |
| LMCO | 5.2 | 0.5 | 32.11 | 32.11 | 0 | 6.175 |
| Water | 1 | 1 | 6 | 6 | 6 | 6 |

Alternatively, LMCO may be encapsulated with a mixture of 90% by weight PTFE and 10% by weight PEDT-PSS by a mechanofusion process. A mixture of LMCO, water, PEDT-PSS, and PTFE latex, prepared as above, was subjected to the mechanofusion process.

Example 7

Carbon Free Cathode Pellet

In this prophetic example, the LMCO particles that are encapsulated with PEDT-PSS and PTFE latex may be prepared into a carbon free cathode layer. For example, the dry cathode-active particles are coated with conductive polymer (e.g., LMCO encapsulated with PEDT). The mixture is pressed in a piston and die assembly under a 2 ton force. The pellet is used to assemble test cells using a highly porous glass fiber disk saturated with a liquid electrolyte solution (1 M $LiPF_6$ in ethylene carbonate: dimethyl carbonate 1:1) as a separator. Disks of metallic lithium are used as a negative electrode.

Example 8

Carbon Free Electrode Film

In this prophetic example, the encapsulated electroactive particles may be prepared into a carbon free electrode film. For example, the dry cathode-active particles that are coated with conductive polymer (e.g., LMCO encapsulated with PEDT-PSS and PTFE latex) are combined with a liquid electrolyte solvent, and a binder such as PVDF or a polymer precursor to form a liquid suspension. This liquid suspension may be applied to the surface of a current collector to form a continuous encapsulated LMCO film. An electrolyte may be formed on the film by coating with the electrolyte solution followed by drying, or by vapor deposition techniques known to those skilled in the art of thin film materials preparation.

A coating of a liquid suspension can be applied to the formed structure to create the counter electrode. Multiple coatings may be used to achieve conformal filling. The system can then be dried and optionally heated for consolidation. A current collector can be applied to one or both surfaces to complete the system.

Example 9

Atomic Force Microscopy Experiments to Measure Repellant Force Characteristics of PEDT-PSS/PTFE Encapsulant Material The interaction between a 10 wt. % PEDT-PSS: 90 v % PTFE film (Example 6) and a typical electrode material consisting of a mesocarbon microbead ("MCMB")(graphitic carbon, Osaka Gas Co.) was measured in cyclohexane using an atomic force microscope ("AFM"). A nominally 6 micron MCMB particle was mounted on an AFM cantilever. The interaction force between this MCMB particle and the film was measured as a function of separation, i.e. force versus distance curves were generated. The particle and the composite film were found to repel one another in this medium.

Example 10

Encapsulated Electrode Particles Via Polymerization of Tetrafluoroethylene in Supercritical Carbon Dioxide In this prophetic example, a high-pressure stainless steel reactor is charged with 10 g of $LiCoO_2$ (Seimi Chemical), 1.5 ml of PEDT emulsion (Baytron P, Bayer), 50 ml of liquid carbon dioxide and 1 g of 50:50 w/w PTFE-$CO_2$ mixture. The contents are cooled to about 0° C. and a small amount of an initiator, bis(perlfuoro-2-propoxypropionyl) peroxide corresponding to a $5\times10^{-5}$ M concentration, is added through a pressure port. Next, the contents of the reactor are warmed to the reaction temperature of 35° C. with energetic stirring. After 4 hours, the reactor is slowly vented and the solid product, a lithiated cobalt oxide encapsulated in a PTFE/PEDT blend, is recovered, extracted with methanol and dried.

Example 11

Encapsulated Electrode Particles Via Spray-coating Using Supercritical Carbon Dioxide In this prophetic example, encapsulated electrode particles with an electrode conductivity of greater than about 0.1 S/cm and a refractive index of less than about 1.7 are formulated as follows:

A high-pressure steel container is charged with 10 g of $LiCoO_2$ powder (Seimi Chemical Co.), 1.5 ml PEDT emulsion (Baytron P, Bayer AG), 0.5 g of poly(1,1,2,2-tetrahydroperfluorodecyl acrylate) (poly(TA-N), DuPont) and 50 ml of liquid carbon dioxide. The vessel is sealed and the contents heated with energetic stirring to 60° C. for 1 hour to dissolve poly(TA-N) in supercritical $CO_2$. Subsequently, polymer-coated particles of lithiated cobalt oxide are recovered by rapid expansion from supercritical solution by spray-drying the suspension through an orifice into an expansion chamber. Polymer-coated particulate material is collected and dried.

Example 12

Encapsulation of Electroactive Particle with a Blend of a Counter-Ion Doped Conductive Polymer/Low Refractive Index Polymer In this prophetic example, the electroactive particles (e.g. LMCO) are coated in a uniform thin layer of conductive polymer/low-refractive index polymer blend. The conductive polymer forms a well-dispersed phase within the low refractive index phase as a result of appropriate choice of dopant for the conductive polymer, which is also chemically compatible with the low refractive index polymer. A solution of conductive polymer (e.g., PEDT) is first formed by oxidation of EDT monomer by the iron(III)salt of a strong acid in solution. The acid anion of this salt is functionalised to be compatible (i.e., able to form molecular solutions) with the desired low refractive index polymer of the final blend. For example, if the low refractive index polymer is fluorinated (for example polymers such as PTFE or a perfluoroalkylacrylate), the acid anion of the iron(III)salt should also be fluorinated (e.g., perfluorohexylsulfonic acid). Oxidation of EDT to PEDT by such an iron(III) salt in solution leads to a form of PEDT that is doped by the functionalized acid, and is therefore compatible with the low-refractive index polymer, resulting in well-dispersed domains within PTFE when they are mixed. To prepare such a polymer, EDT is mixed with a 5-fold mass excess of iron(III)perfluorohexylsulfonate in a chlorofluoro solvent (e.g., chlorotrifluoroethylene) and heated to 70° C. for about 1 hour.

The cathode grains are encapsulated by compatible blends of PEDT and low refractive index polymers by spray drying. A dispersion is first made by mixing particles of active in a solution made from the low refractive index polymer (e.g., PTFE) and PEDT, prepared from the appropriate iron(III) salt (e.g. perfluorohexylsulfonate). Then, the dispersion is dissolved in a common solvent for the two polymers (e.g., chlorotrifluoroethylene). This dispersion is then spray dried to form fine particles on loss of the solvent. As the solvent evaporates from the fine droplets during spraying, PTFE and PEDT form a well-mixed blend that surrounds the active particle. Such a well-mixed blend has a low refractive index from the prevalence of PTFE, and high conductivity from the well-dispersed PEDT phase.

Example 13

PTFE Latex and PEDT Conductive Polymer

A 10 wt % dispersion of PTFE latex was prepared from a stock dispersion of PTFE (Teflon® 5070AN, DuPont, 54–57 wt %). Six milliliters of this dispersion (equiv. to 1 g) were placed in a vial at room temperature. This solution was agitated with a magnetic stir bar at moderate speed, but not enough to create excessive foam. To this dispersion, about 2.95 ml PEDT (Baytron PH, Bayer Ltd., 1.3 wt %) (equiv. to 0.49 g) was added, dropwise for the first half-milliliter, then more rapidly. Baytron PH is an aqueous dispersion of poly(3,4-ethylenedioxythiophene)/poly(styrenesulfonate) in a 1:2.5 weight ratio. The time of addition is about 30–45 seconds. The agitation level was maintained at high speed, but not so high as to cause foaming, for 10 minutes. Lastly, 0.9 ml of N-methyl-2-pyrolidinone (NMP) (equiv. to 0.150 g) was added dropwise. The solution was stirred for five more minutes. Through experimentation, it was discovered that the addition of NMP allows the two components, namely the low refractive index PTFE polymer and the conductive polymer, PEDT, to form a homogeneous structure. There was an additional, unexpected benefit in that the conductivity of pure PEDT was about 300 times more conductive if NMP was added.

This fluid had a concentration of 6.48 wt % and a fluid density of 1.04 g/ml. A film of this fluid was prepared by uniformly coating 0.5 ml over a glass slide of dimension 1×3 inches. The coating was dried at 40° C. for 45 minutes and then for 30 minutes at 150° C. The film thickness of the dried coating was 7.8 microns. Conductivity was determined to be 3.8 S/cm. Spin coating the fluid on glass slides resulted in thinner films (50 nm), with approximately the same conductivity.

A concentration series was performed in order to better understand the percolation effect. Films composed of 6, 10, 25, 50, and 100% PEDT (by weight) were prepared by the procedure described above, with the volumes of the respective components altered to achieve the correct concentration. In addition, two films were prepared at 100% PEDT with 2.5 and 5% NMP. Each formulation was coated on a 1×3 inch glass slide by depositing 0.5 ml of the test fluid. The slides were first dried at 40° C. and then baked for 1 hour at 150° C. Each film was then trimmed to a uniform rectangular dimension and gold contacts were placed at each end. A resistance measurement was made and then the glass slide was weighed, the coating removed, and then weighed again to determine the mass of the coating. From the dimensions of the film and knowing the composition, a calculation was made of the dried coating thickness. Based on this thickness, a volumetric conductivity was determined. Table 3 summarizes the results of these calculations.

TABLE 3

| PEDT Concentration (wt %) | Resistance (ohms) | Thickness (μm) | Conductivity (S/cm) |
|---|---|---|---|
| 6 | 1080 | 7.8 | 3.8 |
| 10 | 553 | 6.5 | 8.6 |
| 25 | 322 | 5.9 | 17 |
| 50 | 234 | 5.0 | 32 |
| 100 with 5% NMP | 30 | 15 | 24 |
| 100 with 2.5% NMP | 65 | 10 | 32 |
| 100 no NMP | 650000 | 5.8 | 0.0092 |

These data demonstrate the surprisingly good conductivity of this composite relative to a coating made with just the conductive component by itself (i.e., adding NMP to PEDT gives the same conductivity as lower concentrations of PEDT mixed with PTFE and NMP). It is believed that, because the PTFE is a 'hard ball' (i.e., non-coalescing latex), the conductive component gets squeezed between these hard balls and thereby forms very thin 'threads' of conductive pathways.

As more PEDT is added it is expected that the refractive index increases (and hence the magnitude of the negative van der Waals force decreases). This was confirmed with AFM measurements in which the repulsive force between a particle of MCMB (Meso Carbon Micro Beads) and the film with m-xylene (refractive index of 1.495) was seen to decrease from being completely repulsive for a film containing 6 wt % PEDT, to mixed attractive/repulsive for a film containing 15 wt % PEDT).

The conductivity values reported in Table 3 are much higher than expected given the information reported in the literature. For example, Ghosh et al, *Adv. Mater.* 10: 1097 (1998) describe a blend of PEDT with polyvinylpyrolidone at 10 wt % PEDT specially treated to get as much conductivity as possible only gives a value of 0.006 S/cm. In comparison, the formulation described above provides 8–9 S/cm.

Figure 6:
FIG. 6 is a photographic representation of lithium cobalt oxide cathode encapsulated with a blend of PTFE and PEDT-PSS, taken by scanning electron microscopy.

FIG. 6 is an SEM photomicrograph of a series of samples encapsulated with the PTFE/PEDT formulation described above. In this micrograph, the roughened outer surface and ropey structure confirm that the polymer coating is present.

Example 14

High Energy Spex Milling of Carbon/PTFE Dispersions

Two high-energy Spex mills were evaluated to achieve dispersion of carbon black in PTFE.

The first mill used a stainless steel vessel and a single stainless steel ball and was the higher energy variant of the two mills. Samples could not be milled for more than 5 minutes at a time due to heating issues. In addition, a large amount of stainless steel contamination in the form of flakes was observed. A slurry containing a 4:1 dilution of PTFE (Teflon AF®) with perfluorononane and 20 wt. % carbon black (Ketjenblack EC600, Akzo Nobel) (dry film basis) was prepared (10 min total milling time). The resulting films were cohesive and crack-free, with R approximately 2 kΩ over 5 cm. The film, however, contained large agglomerates and metal flakes, and the milled slurry could not be passed through a 5 μm filter.

The second mill used a zirconia vessel and 2 zirconia media. Sixty minutes of milling resulted in less effective dispersion than 10 min in the first Spex mill, as evidenced by extensive cracking in the films during drying and the population of large agglomerates. The milled slurry could not be effectively passed through a 5 μm filter; the majority of the solids were removed.

A slurry diluted with Fluorinert™ FC75 (3M™), perfluoro-2-n-butyltetrahydrofuran, rather than perflurononane, was also run in the second Spex mill. The diluted solution was observed to be more viscous before carbon addition. The results at equal milling time were not as good as with the slurry diluted with perfluorononane. The higher solution viscosity indicates that the Fluorinert™ may be a better solvent for PTFE, which could explain why the dispersion is not as good.

Example 15

Dispersion of Carbon Black in PTFE

Three formulations composed of PTFE, carbon black, and solvent were examined. This approach makes use of a soluble form of PTFE (Teflon AF®, DuPont) and conductive carbon black. Two forms of carbon black were examined: SuperP and Ketjenblack EC-600, (Akzo) which has an extremely large surface area (>1100 m²/g). The formulations were prepared by mixing the component into a slurry, as described in Table 4.

TABLE 4

| Formulation | Composition |
|---|---|
| SL-004-4-84-1 | 0.223 g Ketjenblack EC600 (~20 wt. % in final film) |
| | 4.955 g Teflon AF 1601 |
| | 19.822 g perfluorononane |
| SL-004-4-84-2 | 0.223 g SuperP (~20 wt. % in final film) |
| | 4.955 g Teflon AF 1601 |
| | 19.822 g perfluorononane |
| SL-004-4-90-1 | 0.0096 g Ketjenblack EC600 (~10 wt. % in final film) |
| | 4.980 g Teflon AF |
| | 19.920 g perfluorononane |

Each of the three formulations described in Table 2 were milled using glass beads. Fourteen milliliters of each slurry composition was placed in 50 ml beakers with a 1×⅜" stirbar. A sufficient quantity of 3.5 mm glass beads was added to just cover the liquid. This composition was sealed and placed on a stirplate (stir setting 5.0) to mill.

Compositions SL-004-4-84-1 and SL-004-4-84-2 were milled for 68 hours, at which point they were removed, filtering was attempted and firms were made.

Composition SL-004-4-84-1 (Ketjenblack) was quite viscous (not a paste), but passed very easily through a 5 μm filter. Composition SL-004-4-84-2 (SuperP) was much lower in viscosity, and also filtered easily (5 μm filter). Neither slurry could be passed through a 0.5 μm filter. The surface of drawn-down films was lustrous in all cases (slightly more so after filtering), and all films were free of macroscopic agglomerates (up to 70× magnification). Films made from composition SL-004-4-84-2 (SuperP) had a more granular appearance under the microscope, but no resolvable agglomerates.

The resistance of the films made from composition SL-004-4-84-2 (SuperP) was 4-5× higher than films made from composition SL-004-4-84-1 (Ketjenblack). For both slurries, filtering increased the resistance by ~50%.

Comparison of carbon films prepared via the above procedure produced a much finer film structure, with less agglomeration of carbon particle, compared to the film produced from the Wiggle Bug process.

Those skilled in the art should appreciate that all parameters and configurations described herein are meant to be exemplary and that actual parameters and configurations will depend upon the specific application in which the systems and methods of the present invention are used. Those skilled in the art should recognize, or be able to ascertain, using no more than routine experimentation, many equivalents to the some embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each feature, system, or method described herein. In addition, any combination of two or more features, systems or methods, if such features, systems or methods are not mutually inconsistent, is considered to be within the scope of the present invention.

What is claimed is:

1. An electrochemical device comprising:
   a first electrode in electronic communication with a first current collector;
   a second electrode in electronic communication with a second current collector; and
   an electrolyte in ionic contact with said first and second electrodes, wherein at least one of the first and second electrodes includes a plurality of distinct first particles, wherein the distinct first particles comprise a core material and a layer, said layer consisting essentially of a plurality of second particles substantially coating an outer surface of the core material, wherein the core material comprises an electroactive material in ionic contact with the electrolyte, and wherein the layer comprises an electronically conductive material and sufficient low index material such that the refractive index of the layer is less than that of the electrolyte or an electrolyte precursor, and wherein at least one distinct first particle is in electrical contact with a second distinct first particle.

2. The electrochemical device of claim 1, wherein the low index material comprises at least about 50 wt % of the layer.

3. The electro chemical device of claim 1, wherein:

the first electrode comprises a plurality of distinct first particles, wherein the distinct first particles comprise a core material and a layer, said layer consisting essentially of a plurality of second particles substantially coating an outer surface of the core materials, wherein the core material comprises an electroactive material in ionic contact with the electrolyte, and wherein the layer compnses a conductive material and sufficient low index material such that the refractive index of the layer is less than that of the electrolyte or an electrolyte precursor, and wherein at least one distinct first particle is in electrical contact with a second distinct first particle; and the second electrode comprises a plurality of coated particles, wherein the coated particles comprise an electroactive core material and a conductive layer, said layer substantially coating an outer surface of the core material, wherein at least one coated particle is in electrical contact with a coated first particle.

4. The electrochemical device of claim 1, wherein:

the second electrode comprises a plurality of distinct first particles, wherein the distinct first particles comprise a core material and a layer, said layer consisting essentially of a plurality of second particles and substantially coating an outer surface of the core materials, wherein the core material comprises an electroactive material in ionic contact with the electrolyte, and wherein the layer compnses a conductive material and sufficient high index material such that the refractive index of the layer is greater than that of the electrolyte or an electrolyte precursor.

5. The device of claim 1, wherein the low index material is selected from the group consisting of fluorinated polymers.

6. The device of claim 1, wherein the low index material is selected from the group consisting of polytetrafluoroethylene, poly(vinylidene fluoride), poly(fluoroalkyl acrylate), poly(fluoroalkyl methacrylate), polypropylene, vanadium oxide, fluorinated esters of methacrylic acid, and fluorinated esters of acrylic acids.

7. An electrochemical device comprising a first electrode in electronic communication with a first current collector;

a second electrode in electronic communication with a second current collector; and an ionically conductive medium in ionic contact with said first and second electrodes, wherein at least one of the first and second electrodes includes a plurality of distinct first particles, wherein the distinct first particles comprise a core material and a layer, said layer consisting essentially of a plurality of second particles substantially coating an outer surface of the core material, wherein the core material comprises an electroactive material in ionic contact with the electrolyte, and wherein the layer comprises an electronically conductive material, and wherein at least one distinct first particle is in contact with a second distinct first particle such that the distinct first particles are electrically connected, and wherein the dispersion force between the distinct first particles of one electrode is repulsive with respect to the other electrode when combined with the ionically conductive medium or its precursor.

8. The device of claim 7, wherein the second particles of the layer further include particles of a secondary material having a low refractive index and being present in an amount such that the refractive index of the layer is less than that of the electrolyte or an electrolyte precursor.

9. The device of claim 8, wherein at least one of the electrically conductive material and the secondary material comprise elastic materials that are readily deformable by application of mechanical or thennal energy.

10. An electrochemical device comprising:

a first electrode in electronic communication with a first current collector;

a second electrode in electronic communication with a second current collector; and an electrolyte in ionic contact with said first and second electrodes, wherein at least one of the first and second electrodes includes a plurality of distinct first particles, wherein the distinct first particles comprise a core material and a layer substantially coating an outer surface of the core material, wherein the core material comprises an electroactive material in ionic contact with the electrolyte, and wherein the layer comprises a polythiophene material, said layer having an electronic conductivity greater than about 2 S/cm and being substantially free of elemental carbon, and wherein at least one distinct first particle is in contact with a second distinct first particle such that the distinct first particles are electrically connected.

11. The electro chemical device of claim 10, wherein both the first and second electrodes comprise a plurality of distinct first particles, the distinct first particles comprising a core material and a layer, wherein the core material comprises an electroactive material and the layer comprises an electronically conductive material having an electronic conductivity greater than about 2 S/cm and a Young's Modulus less than about 100 GPa.

12. The device of claim 1, 7 or 10, wherein the layer comprises a continuous network of electrically connected conductive material.

13. The device of claim 1, 7 or 10, wherein adjacent distinct first particles exert attractive forces such that elastic deformation occurs at a surface contact interface between the adjacent particles.

14. The device of claim 1 or 7, wherein the conductive material is ionically conductive.

15. The device of claim 1 or 7, wherein the conductive material is a conductive polymer.

16. The device of claim 1 or 7, wherein the conductive material comprises a conductive polymer selected from the group consisting of polyanilines, polythiophenes, polypyrroles, or copolymers or derivatives thereof.

17. The device of claim 1 or 7, wherein the conductive material comprises poly(3,4-ethylene dioxythiophene).

18. The device of claim 16, wherein the conductive polymer further includes a dopant which increases the conductivity of the conducting polymer.

19. The device of claim 1 or 7, wherein the conductive material includes a conductive oxide.

20. The device of claim 19, wherein the conductive oxide includes vanadium oxide, indium tin oxide, lithium cobalt oxide, titanium oxide or alloys thereof.

21. The device of claim 1 or 7, wherein the conductive material includes one or more of a metal, a metal carbide, or a metal sulfide.

22. The device of claim 10, wherein the layer further includes a material having a refractive index lower than about 2.0.

23. The device of claim 10, wherein the layer further includes a material having a refractive index lower than about 1.5.

24. The device of claim 10, wherein the layer further includes a material having a refractive index lower than about 1.4.

25. The device of claim 1 or 7, wherein the conductive material has an electronic conductivity of at least about $10^{-2}$ S/cm.

26. The device of claim 1 or 7, wherein the conductive material has an electronic conductivity of at least about $10^{-1}$ S/cm.

27. The device of claim 1 or 7, wherein the conductive material has an electronic conductivity of at least about 1 S/cm.

28. The device of claim 1 or 7, wherein the conductive material has an electronic conductivity of at least about 10 S/cm.

29. The device of claim 1 or 7, wherein the second particles of the layer include particles having an ionic conductivity of at least about $10^{-7}$ S/cm.

30. The device of claim 1 or 7, wherein the second particles of the layer include particles having an ionic conductivity of at least about $10^{-6}$ S/cm.

31. The device of claim 1, 7 or 10, wherein the layer has a thickness less than about 1 micron.

32. The device of claim 1, 7 or 10, wherein the layer has a thickness less than about 0.1 micron.

33. The device of claim 1, 7 or 10, wherein the layer has a thickness less than about 0.05 micron.

34. The device of claim 1 or 7, wherein the second particles of the layer further include a filler material, said filler being dissolvable upon contact with an electrolyte solution.

35. The device of claim 1, 7 or 10, wherein the electroactive material of the first and/or second electrode includes a lithium intercalating material.

36. The device of claim 1, 7 or 10, wherein the first electrode is a cathode and the electroactive material comprises one or more of the following: $LiCoO_2$, $LiCoO_2$ doped with Mg, $LiNiO_2$, $LiMn_2O_4$, $LiMnO_2$, $LiMnO_2$ doped with Al, $LiFePO_4$, $LiMnPO_4$, $Li_xV_6O_{13}$, $Li_2Fe_2(SO_4)_3$, $V_2O_5$, $V_6O_{11}$, and $SnO_2$.

37. The device of claim 1, 7 or 10, wherein the second electrode is an anode and the electroactive material comprises one or more of the following:
carbon, amorphous carbon, graphite, mesocarbon microbeads, Li, LiAl, $Li_9Al_4$, $Li_3Al$, Zn, LiZn, Ag, LiAg, $Li_{10}Ag_3$, B, $Li_5B_4$, $Li_7B_6$, Ge, Si, $Li_{12}Si_7$, $Li_{21}Si_8$, $Li_{13}Si_4$, $Li_{21}Si_5$, Sn, $Li_5Sn_2$, $Li_{13}Sn_5$, $Li_7Sn_2$, $Li_{22}Sn_5$, Sb, $Li_2Sb$, $Li_3Sb$, Bi, LiBi, and $Li_3Bi$, $SnO_2$, SnO, MnO, $Mn_2O_3$, $MnO_2$, $Mn_3O_4$, CoO, NiO, FeO, $LiFe_2O_4$, $TiO_2$, $LiTi_2O_4$, and glass.

38. The device of claim 1, 7 or 10, wherein the electrolyte comprises a solid polymer electrolyte.

39. The device of claim 1, 7 or 10, wherein the electrolyte comprises one or more of the following: poly(ethylene oxide), poly(styrene), poly(acrylonitrile), poly(vinylidene fluoride), ethylene carbonate, diethyl carbonate, dimethyl carbonate, propylene carbonate, or a block copolymer.

40. The device of claim 1, 7 or 10, wherein the electrolyte comprises a glass comprising at least one of LiI, LiF, LiCl, glassy compositions of $Li_2O$—$B_2O_3$—$Bi_2O_3$, glassy compositions of $Li_2O$—$B_2O_3$—$P_2O_5$, glassy compositions of $Li_2O$—$B_2O_3$—PbO, or a sol or gel of the oxides or hydroxides of Ti, Zr, Pb, Mo, W, Si, Ge, Al, B, P, or Bi.

41. The device of claim 10, wherein the polythiophene material comprises poly(3,4-ethylene dioxythiophene).

42. The device of claim 1, wherein the low index material has a refractive index lower than about 2.0.

43. The device of claim 1, wherein the low index material has a refractive index lower than about 1.5.

44. The device of claim 1, wherein the low index material has a refractive index lower than about 1.4.

45. The device of claim 7, wherein the second particles of the layer further include particles having a refractive index lower than about 2.0.

46. The device of claim 7, wherein the second particles of the layer further include particles having a refractive index lower than about 1.5.

47. The device of claim 7, wherein the second particles of the layer further include particles having a refractive index lower than about 1.4.

48. The device of claim 10, wherein the polythiophene material has an electronic conductivity of at least about 10 S/cm.

49. The device of claim 10, wherein the layer has an ionic conductivity of at least about $10^{-7}$ S/cm.

50. The device of claim 10, wherein the layer has an ionic conductivity of at least about $10^{-6}$ S/cm.

51. The device of claim 10, wherein the layer further includes a filler material, said filler being dissolvable upon contact with an electrolyte solution.

52. An electrochemical device comprising:
a first electrode in electronic communication with a first current collector;
a second electrode in electronic communication with a second current collector; and
an electrolyte in ionic contact with said first and second electrodes,
wherein at least one of the first and second electrodes includes a plurality of distinct first particles, wherein the distinct first particles comprise a core material and a layer substantially coating an outer surface of the core material, said layer comprising particles of a low index material and a conductive polymer occupying a region between the particles of the low index material,
wherein the conductive polymer composition differs from those of the electrolyte and other electrode components,
wherein the core material comprises an electroactive material in ionic contact with the electrolyte, and
wherein the layer comprises an electronically conductive material and sufficient low index material such that the refractive index of the layer is less than that of the electrolyte or an electrolyte precursor, and
wherein at least one distinct first particle is in electrical contact with a second distinct first particle.

* * * * *